US012706026B2

(12) United States Patent
Yang et al.

(10) Patent No.: US 12,706,026 B2
(45) Date of Patent: Aug. 11, 2026

(54) DISPLAY DEVICE AND ELECTRONIC APPARATUS INCLUDING THE SAME

(71) Applicant: SAMSUNG DISPLAY CO., LTD., Yongin-si (KR)

(72) Inventors: Jin-Wook Yang, Yongin-si (KR); Hongsoo Kim, Yongin-si (KR); Sehyuk Park, Yongin-si (KR); DongGyu Lee, Yongin-si (KR); Jae-Hyeon Jeon, Yongin-si (KR); Eui-Myeong Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/010,307

(22) Filed: Jan. 6, 2025

(65) Prior Publication Data

US 2025/0252906 A1 Aug. 7, 2025

(30) Foreign Application Priority Data

Feb. 5, 2024 (KR) ........................ 10-2024-0017307

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2310/0275* (2013.01); *G09G 2310/0297* (2013.01); *G09G 2310/08* (2013.01); *G09G 2330/021* (2013.01)

(58) Field of Classification Search
CPC ................... G09G 3/32; G09G 3/3233; G09G 2310/0275; G09G 2310/0297; G09G 2310/08; G09G 2330/02
See application file for complete search history.

(56) References Cited

U.S. PATENT DOCUMENTS 8,384,708 B2 * 2/2013 Moon .................. G09G 3/3607 345/84
8,957,837 B2 * 2/2015 Han ..................... G09G 3/3233 345/76
9,368,054 B2 * 6/2016 Peng ........................ G09G 3/20
(Continued)

FOREIGN PATENT DOCUMENTS

KR 10-2020-0014465 A 2/2020
KR 10-2024-0033711 A 3/2024
KR 10-2024-0046384 A 4/2024

*Primary Examiner* — Michael J Jansen, II
(74) *Attorney, Agent, or Firm* — F. CHAU & ASSOCIATES, LLC

(57) ABSTRACT

A display device includes first and second pixels disposed in a pixel row, first and second data lines connected to the first and second pixels, respectively, a data driver providing first and second data voltages to a first output line, and a demultiplexer selectively connecting the first and second data lines to the first output line. Each of the first and second pixels includes a first transistor, a second transistor, a third transistor, a first capacitor, and a light emitting element. The first data voltage is written to the first pixel through the first data line in a first period of a writing period in which a write gate signal has a turn-on voltage level, and the second data voltage is written to the second pixel through the second data line in a second period of the writing period that is after the first period.

25 Claims, 30 Drawing Sheets

(56) References Cited

U.S. PATENT DOCUMENTS 9,626,905 B2 * 4/2017 In .......................... G09G 3/3233
9,685,116 B2 * 6/2017 Lee ...................... G09G 3/3291
9,997,095 B2 * 6/2018 Kim ..................... G09G 3/3275
10,004,124 B1 * 6/2018 Ko ........................... G09G 3/14
10,354,582 B2 * 7/2019 Kim ..................... G09G 3/3225
10,867,560 B2 * 12/2020 Yoon .................... H10K 59/352
10,991,290 B1 * 4/2021 Yang ........................ G09G 3/20
11,263,976 B2 * 3/2022 Yang .................... G09G 3/3233
11,295,662 B2 * 4/2022 Jeon ..................... G09G 3/3233
11,386,844 B2 * 7/2022 Jeon ..................... G09G 3/3266
11,393,399 B2 * 7/2022 Na ....................... G09G 3/3258
11,580,906 B2 * 2/2023 Wang ................... G09G 3/3233
11,657,761 B2 * 5/2023 In .......................... G09G 3/3275
345/211
11,696,475 B2 * 7/2023 Lee ...................... G09G 3/3233
257/40
11,765,953 B2 * 9/2023 Lim ................... H10K 59/1315
345/204
11,810,503 B2 * 11/2023 Kwon .................. G09G 3/3208
11,887,521 B2 * 1/2024 Yang .................... G09G 3/3233
11,935,453 B2 * 3/2024 Park ..................... G09G 3/2003
11,961,463 B2 * 4/2024 Yang ........................ G09G 3/32
11,961,474 B2 * 4/2024 Yang .................... G09G 3/3266
12,008,952 B2 * 6/2024 Yang .................... G09G 3/3233
12,033,568 B2 * 7/2024 Lim ......................... G09G 3/32
12,262,589 B2 * 3/2025 Kim ..................... G09G 3/3233
12,322,333 B2 * 6/2025 Wang ................... G09G 3/3233
12,322,334 B2 * 6/2025 Cho ..................... G09G 3/3233
2011/0032249 A1 * 2/2011 Moon .................. G09G 3/3614
345/214
2012/0013597 A1 * 1/2012 Han ..................... G09G 3/3233
345/212
2015/0016103 A1 * 1/2015 Peng ........................ G09G 3/20
362/231
2015/0035734 A1 * 2/2015 Lee ...................... G09G 3/3258
345/76
2015/0348464 A1 * 12/2015 In .......................... G09G 3/2022
345/82
2017/0061928 A1 * 3/2017 Kim ..................... G09G 3/3685
2017/0076665 A1 * 3/2017 Kim ..................... G09G 3/3225
2019/0164502 A1 * 5/2019 Yoon .................... H10K 59/353
2021/0049965 A1 * 2/2021 Jeon ..................... G09G 3/3266
2021/0118368 A1 * 4/2021 In .......................... G09G 3/3275
2021/0248961 A1 * 8/2021 Yang .................... G09G 3/3266
2021/0280130 A1 * 9/2021 Wang ................... G09G 3/3233
2021/0335953 A1 * 10/2021 Kim ..................... H10K 59/131
2021/0366397 A1 * 11/2021 Na ....................... G09G 3/3291
2021/0375192 A1 * 12/2021 Jeon ..................... G09G 3/3233
2021/0376041 A1 * 12/2021 Lee .................... H10K 59/1216
2022/0366828 A1 * 11/2022 Park ..................... G09G 3/2003
2022/0366842 A1 * 11/2022 Kwon .................. G09G 3/3208
2023/0122487 A1 * 4/2023 Yang ........................ G09G 3/20
345/81
2023/0157112 A1 * 5/2023 Lim ................... H10K 59/1213
345/204
2023/0306906 A1 * 9/2023 Yang .................... G09G 3/3233
2023/0419882 A1 * 12/2023 Lim ......................... G09G 3/32
2024/0078963 A1 * 3/2024 Yang ........................ G09G 3/20
2024/0112622 A1 * 4/2024 Yang ........................ G09G 3/32
2024/0161693 A1 * 5/2024 Cho ..................... G09G 3/3266

* cited by examiner

DISPLAY DEVICE AND ELECTRONIC APPARATUS INCLUDING THE SAME

CROSS-REFERENCE TO RELATED APPLICATION(S)

This US patent application claims priority under 35 USC § 119 to Korean Patent Application No. 10-2024-0017307 filed on Feb. 5, 2024, in the Korean Intellectual Property Office (KIPO), the disclosure of which is incorporated by reference in its entirety herein.

1. TECHNICAL FIELD

Embodiments of the inventive concept are directed to a display device.

2. DISCUSSION OF RELATED ART

A display device may include a data driver, which is responsible for converting and transmitting data signals to a display panel. The data driver may include amplifiers to boost the signal strength, ensuring that the signals are sufficiently strong to drive a pixel on the display panel accurately.

As a resolution of the display panel increases, the number of amplifiers of the data may increase, and accordingly, a manufacturing cost of the display device may increase. A demultiplexer driving method in which each of the amplifiers of the data driver outputs data voltages in a time-division manner may be used to reduce the manufacturing cost of the display device.

In a display device applying the demultiplexer driving method, one amplifier of the data driver may be selectively connected to two or more data lines. Accordingly, a time for transmitting the data voltage to the data line may be reduced. However, due to this time reduction, a data writing time for writing the data voltage to a driving transistor included in the pixel may not be sufficiently secured.

SUMMARY

Embodiments provide a display device with a reduced manufacturing cost and which secures a sufficient data writing time and an electronic apparatus including the display device.

A display device according to an embodiment includes a first pixel and a second pixel disposed in a pixel row, a first data line and a second data line connected to the first pixel and the second pixel, respectively, a data driver which provides a first data voltage and a second data voltage to a first output line, and a demultiplexer which selectively connects the first data line and the second data line to the first output line. Each of the first pixel and the second pixel includes a first transistor including a gate electrode connected to a first node, a first electrode connected to a second node, and a second electrode connected to a third node, a second transistor including a gate electrode which receives a write gate signal, a first electrode connected to a corresponding data line among the first data line and the second data line, and a second electrode, a third transistor including a gate electrode which receives a compensation gate signal, a first electrode connected to the third node, and a second electrode connected to the first node, a first capacitor connected between the first node and the second electrode of the second transistor, and a light emitting element which emits light corresponding to a driving current generated by the first transistor. The first data voltage is written to the first pixel through the first data line in a first period of a writing period in which the write gate signal has a turn-on voltage level, and the second data voltage is written to the second pixel through the second data line in a second period of the writing period that is after the first period.

In an embodiment, the display device may further include a third pixel and a fourth pixel disposed in the pixel row, and a third data line and a fourth data line connected to the third pixel and the fourth pixel, respectively. The data driver may provide a third data voltage and a fourth data voltage to a second output line. The demultiplexer may selectively connect the third data line and the fourth data line to the second output line. The third data voltage may be written to the third pixel through the third data line in the first period, and the fourth data voltage may be written to the fourth pixel through the fourth data line in the second period.

In an embodiment, the first pixel may be one of a red pixel and a blue pixel, the second pixel may be another one of the red pixel and the blue pixel different from the first pixel, and each of the third and fourth pixels may be a green pixel.

In an embodiment, the first data line and the third data line may be disposed between the first pixel and the third pixel, and the second data line and the fourth data line may be disposed between the second pixel and the fourth pixel.

In an embodiment, the demultiplexer may include a first selection transistor which connects the first data line to the first output line in response to a first selection signal, a second selection transistor which connects the second data line to the first output line in response to a second selection signal, a third selection transistor which connects the third data line to the second output line in response to the first selection signal, and a fourth selection transistor which connects the fourth data line to the second output line in response to the second selection signal.

In an embodiment, the demultiplexer may include a first selection transistor which connects the first data line to the first output line in response to a selection signal, and a second selection transistor which connects the third data line to the second output line in response to the selection signal. The second and fourth data lines may be directly connected the first and second output lines, respectively.

In an embodiment, the first pixel may be one of a red pixel and a blue pixel, each of the second and fourth pixels may be a green pixel, and the third pixel may be another one of the red pixel and the blue pixel different from the first pixel.

In an embodiment, the demultiplexer may include a first selection transistor which connects the first data line to the first output line in response to a first selection signal, a second selection transistor which connects the second data line to the first output line in response to a second selection signal, a third selection transistor which connects the third data line to the second output line in response to the first selection signal, and a fourth selection transistor which connects the fourth data line to the second output line in response to the second selection signal.

In an embodiment, the demultiplexer may include a first selection transistor which connects the first data line to the first output line in response to a selection signal, and a second selection transistor which connects the third data line to the second output line in response to the selection signal. The second and fourth data lines may be directly connected the first and second output lines, respectively.

In an embodiment, the display device may further include a fifth pixel and a sixth pixel disposed in the pixel row, and a fifth data line and a sixth data line connected to the fifth pixel and the sixth pixel, respectively. The data driver may provide a fifth data voltage and a sixth data voltage to a third output line. The demultiplexer may selectively connect the fifth data line and the sixth data line to the third output line. The fifth data voltage may be written to the fifth pixel through the fifth data line in the first period, and the sixth data voltage may be written to the sixth pixel through the sixth data line in the second period.

In an embodiment, each of the first and second pixels may be a red pixel, each of the third and fourth pixels may be a green pixel, and each of the fifth and sixth pixels may be a blue pixel.

In an embodiment, the demultiplexer may include a first selection transistor which connects the first data line to the first output line in response to a first selection signal, a second selection transistor which connects the second data line to the first output line in response to a second selection signal, a third selection transistor which connects the third data line to the second output line in response to the first selection signal, a fourth selection transistor which connects the fourth data line to the second output line in response to the second selection signal, a fifth selection transistor which connects the fifth data line to the third output line in response to the first selection signal, and a sixth selection transistor which connects the sixth data line to the third output line in response to the second selection signal.

In an embodiment, the demultiplexer may include a first selection transistor which connects the first data line to the first output line in response to a selection signal, a second selection transistor which connects the third data line to the second output line in response to the selection signal, and a third selection transistor which connects the fifth data line to the third output line in response to the selection signal. The second, fourth, and sixth data lines may be directly connected the first, second, and third output lines, respectively.

In an embodiment, each of the first pixel and the second pixel may further include a fourth transistor including a gate electrode which receives an initialization gate signal, a first electrode which receives a first initialization voltage, and a second electrode connected to the first node, a fifth transistor including a gate electrode which receives the compensation gate signal, a first electrode which receives a reference voltage, and a second electrode connected to a fourth node to which the second electrode of the second transistor and the first capacitor are connected, a sixth transistor including a gate electrode, a first electrode connected to the third node, and a second electrode connected to the light emitting element, a seventh transistor including a gate electrode which receives a bypass gate signal, a first electrode which receives a second initialization voltage, and a second electrode connected to the light emitting element, and a second capacitor connected between a power line which transmits a driving voltage and the fourth node.

In an embodiment, the power line may be connected to the second node, and the gate electrode of the sixth transistor may receive an emission control signal.

In an embodiment, each of the first pixel and the second pixel may further include an eighth transistor including a gate electrode which receives a first emission control signal, a first electrode connected to the power line, and a second electrode connected to the second node, and a ninth transistor including a gate electrode which receives the bypass gate signal, a first electrode which receives a bias voltage, and a second electrode connected to the second node. The gate electrode of the sixth transistor may receive a second emission control signal.

In an embodiment, each of the first pixel and the second pixel may further include an eighth transistor including a gate electrode which receives an emission control signal, a first electrode connected to the power line, and a second electrode connected to the second node, a ninth transistor including a gate electrode which receives the bypass gate signal, a first electrode which receives a bias voltage, and a second electrode connected to the second node, and a tenth transistor including a gate electrode which receives the compensation gate signal, a first electrode connected to the power line, and a second electrode connected to the second node. The gate electrode of the sixth transistor may receive the emission control signal.

In an embodiment, each of the first transistor, the second transistor, the third transistor, the fourth transistor, the fifth transistor, the sixth transistor, and the seventh transistor may be a P-type transistor.

In an embodiment, each of the first pixel and the second pixel may further include a fourth transistor including a gate electrode which receives the compensation gate signal, a first electrode which receives a reference voltage, and a second electrode connected to a fourth node to which the first capacitor is connected, a fifth transistor including a gate electrode which receives a subsequent compensation gate signal, a first electrode connected to the second node, and a second electrode connected to the fourth node, a sixth transistor including a gate electrode which receives an emission control signal, a first electrode connected to the third node, and a second electrode connected to the light emitting element, a seventh transistor including a gate electrode which receives a bypass gate signal, a first electrode which receives an initialization voltage, and a second electrode connected to the light emitting element, an eighth transistor including a gate electrode which receives the bypass gate signal, a first electrode connected to a power line which transmits a driving voltage, and a second electrode connected to the second node, and a second capacitor connected between the power line and the fourth node.

In an embodiment, each of the first transistor, the second transistor, the sixth transistor, and the eighth transistor may be a P-type transistor, and each of the third transistor, the fourth transistor, the fifth transistor, and the seventh transistor may be a N-type transistor.

A display device according to an embodiment includes a pixel which emits a light based on a data voltage, a data line connected to the pixel, and a data driver which provides the data voltage to the data line. The pixel includes a first transistor including a gate electrode connected to a first node, a first electrode connected to a second node, and a second electrode connected to a third node, a second transistor including a gate electrode which receives a write gate signal, a first electrode connected to the data line, and a second electrode, a third transistor including a gate electrode which receives a compensation gate signal, a first electrode connected to the third node, and a second electrode connected to the first node, a first capacitor connected between the first node and the second electrode of the second transistor, and a light emitting element which emits light corresponding to a driving current generated by the first transistor. The data line is connected to the data driver so that the data voltage is applied to the data line in a first period of a writing period in which the write gate signal has a turn-on voltage level, and the data line is floated so that a voltage of the data line is maintained at the data voltage in a second period of the writing period that is after the first period.

A display device according to an embodiment includes a pixel which emits light based on a data voltage, a data line connected to the pixel, and a data driver which provides the data voltage to the data line. The pixel includes a first transistor including a gate electrode connected to a first node, a first electrode connected to a second node, and a second electrode connected to a third node, a second transistor including a gate electrode which receives a write gate signal, a first electrode connected to the data line, and a second electrode, a third transistor including a gate electrode which receives a compensation gate signal, a first electrode connected to the third node, and a second electrode connected to the first node, a first capacitor connected between the first node and the second electrode of the second transistor, and a light emitting element which emits light corresponding to a driving current generated by the first transistor. The data line is charged with a previous data voltage different from the data voltage in a first period of a writing period in which the write gate signal has a turn-on voltage level, and the data line is connected to the data driver so that the data voltage is applied to the data line in a second period of the writing period that is after the first period.

In an embodiment, the data line may be floated so that a voltage of the data line may be maintained at the previous data voltage in the first period.

In an embodiment, the data line may be connected to the data driver so that the previous data voltage may be applied to the data line in the first period.

In an electronic apparatus including a display device which displays an image and a processor which controls the display according to an embodiment, the display device includes a first pixel and a second pixel disposed in a pixel row, a first data line and a second data line connected to the first pixel and the second pixel, respectively, a data driver which provides a first data voltage and a second data voltage to a first output line, and a demultiplexer which selectively connects the first data line and the second data line to the first output line. Each of the first pixel and the second pixel includes a first transistor including a gate electrode connected to a first node, a first electrode connected to a second node, and a second electrode connected to a third node, a second transistor including a gate electrode which receives a write gate signal, a first electrode connected to a corresponding data line among the first data line and the second data line, and a second electrode, a third transistor including a gate electrode which receives a compensation gate signal, a first electrode connected to the third node, and a second electrode connected to the first node, a first capacitor connected between the first node and the second electrode of the second transistor, and a light emitting element which emits light corresponding to a driving current generated by the first transistor. The first data voltage is written to the first pixel through the first data line in a first period of a writing period in which the write gate signal has a turn-on voltage level, and the second data voltage is written to the second pixel through the second data line in a second period of the writing period that is after the first period.

A display device according to at least one of the embodiments may include the demultiplexer, where a writing period and a compensation period are separated, so that the manufacturing cost of the display device may be reduced, and sufficient data writing time may be secured.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
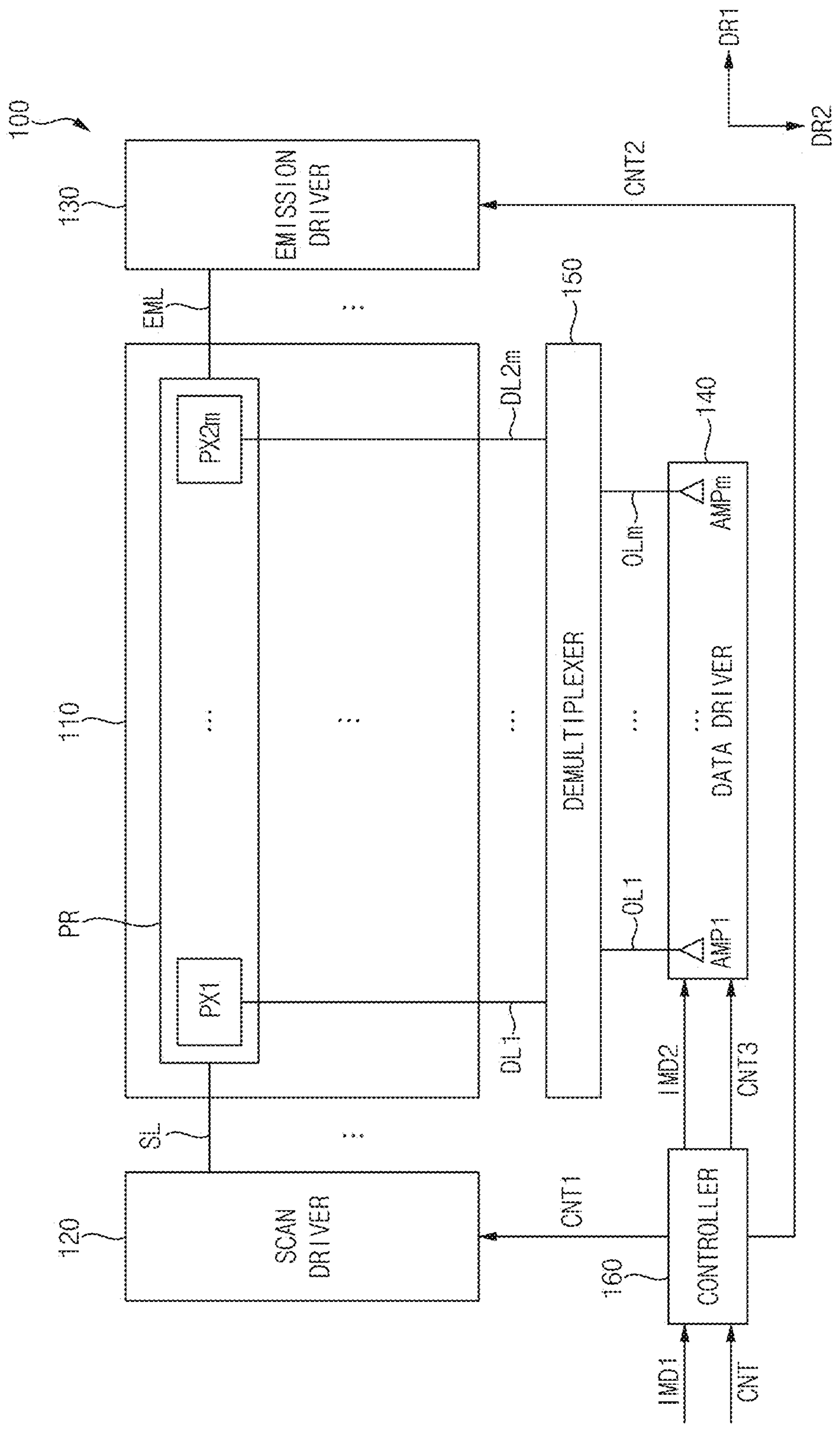
FIG. 1 is a block diagram showing a display device according to an embodiment.

Hereinafter, a display device and an electronic apparatus according to an embodiment of the present disclosure will be described in more detail with reference to the accompanying drawings. The same or similar reference numerals will be used for the same elements in the accompanying drawings.

FIG. 1 is a block diagram showing a display device 100 according to an embodiment.

Referring to FIG. 1, the display device 100 may include a display panel 110, a scan driver 120 (e.g., a first driver circuit), an emission driver 130 (e.g., a second driver circuit), a data driver 140 (e.g., a third driver circuit), a demultiplexer 150, and a controller 160 (e.g., a controller circuit).

The display panel 110 may include a plurality of pixel rows PR. Each of the pixel rows PR may extend in a first direction DR1 (e.g., row direction). The pixel rows PR may be arranged along a second direction DR2 (e.g., column direction) that intersects the first direction DR1. A given one of the pixel rows PR may include first to $2m^{th}$ (m is a natural number of 3 or more) pixels PX1, . . . , PX2*m* arranged along one direction (for example, the first direction DR1).

In an embodiment, each of the first to $2m^{th}$ pixels PX1, . . . , PX2*m* are operated using a separated compensation driving (SCD) method. The method includes a compensation period in which a threshold voltage of a driving transistor is compensated is separated from a writing period in which a data voltage is written to a gate electrode of the driving transistor. The first to $2m^{th}$ pixels PX1, . . . , PX2*m* will be described with reference to FIGS. 2 to 14.

The display panel 110 may include a plurality of scan lines SL, a plurality of emission control lines EML, and first to $2m^{th}$ data lines DL1, . . . , DL2*m*. Each of the scan lines SL may extend in the first direction DR1. A given one of the scan lines SL may be connected to the first to $2m^{th}$ pixels PX1, . . . , PX2*m* included in one pixel row PR. Each of the emission control lines EML may extend in the first direction DR1. A given one of the emission control lines EML may be connected to the first to $2m^{th}$ pixels PX1, . . . , PX2*m* included in one pixel row PR. Each of the first to $2m^{th}$ data lines DL1, . . . , DL2*m* may extend in the second direction DR2. The first to $2m^{th}$ data lines DL1, . . . , DL2*m* may be connected to the first to $2m^{th}$ pixels PX1, . . . , PX2*m*, respectively.

The scan driver 120 may sequentially provide scan signals to the scan lines SL. The scan driver 120 may sequentially generate the scan signals respectively corresponding to the pixel rows PR based on a first control signal CNT1. The first control signal CNT1 may include a scan clock signal, a scan start signal, etc.

The emission driver 130 may sequentially provide emission control signals to the emission control lines EML. The emission driver 130 may sequentially generate the emission control signals respectively corresponding to the pixel rows PR based on a second control signal CNT2. The second control signal CNT2 may include an emission clock signal, an emission start signal, etc.

The data driver 140 may provide first to $2m^{th}$ data voltages to first to $m^{th}$ output lines OL1, . . . , OLm. The data driver 140 may include first to $m^{th}$ amplifiers AMP1, . . . , AMPm respectively connected to the first to $m^{th}$ output lines OL1, . . . , OLm. The data driver 140 may generate the first to $2m^{th}$ data voltages based on second image data IMD2 and a third control signal CNT3. In an embodiment, the second image data IMD2 includes grayscale values corresponding to the first to $2m^{th}$ pixels PX1, . . . , PX2*m*, respectively. The third control signal CNT3 may include a data clock signal, a horizontal start signal, a load signal, etc.

The demultiplexer 150 may selectively connect the first to $2m^{th}$ data lines DL1, . . . , DL2*m* to the first to $m^{th}$ output lines OL1, . . . , OLm. In an embodiment, the demultiplexer 150 selectively connects two data lines to one output line. Accordingly, the number of amplifiers AMP1, . . . , AMPm included in the data driver 140 may be reduced to half the number of data lines DL1 . . . , DL2*m*, and a manufacturing cost of the display device 100 may be reduced.

The controller 160 may control an operation (or driving) of the scan driver 120, an operation (or driving) of the emission driver 130, an operation (or driving) of the data driver 140, and an operation (or driving) of the demultiplexer 150. The controller 160 may generate the first control signal CNT1, the second control signal CNT2, the second image data IMD2, and the third control signal CNT3 based on first image data IMD1 and a control signal CNT. In an embodiment, the first image data IMD1 includes grayscale values corresponding to the first to $2m^{th}$ pixels PX1, . . . , PX2*m*, respectively. The controller 160 may convert the first image data IMD1 into the second image data IMD2. The control signal CNT may include a master clock signal, a vertical synchronization signal, a horizontal synchronization signal, a data enable signal, etc.

Figure 2:
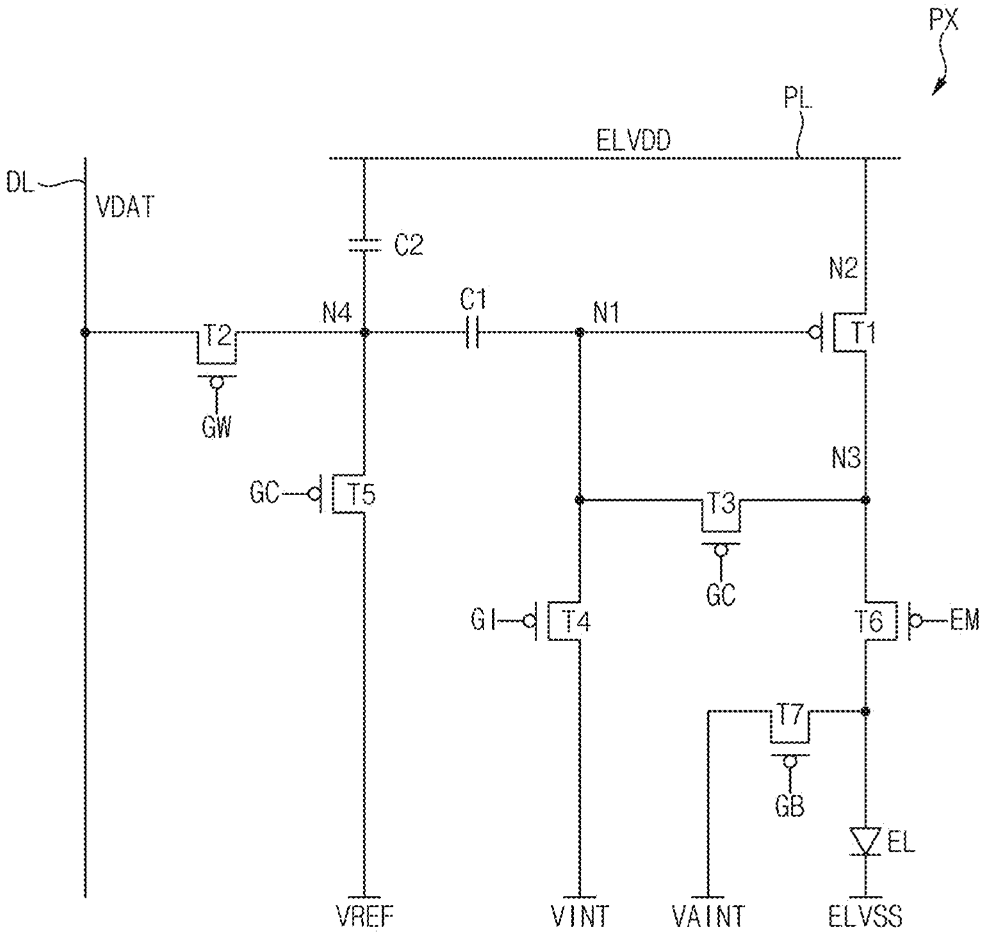
FIG. 2 is a circuit diagram showing an example of a pixel included in the display device of FIG. 1.

FIG. 2 is a circuit diagram showing an example of a pixel PX included in the display panel 110 of FIG. 1.

Referring to FIG. 2, the pixel PX may include a first transistor T1, a second transistor T2, a third transistor T3, a fourth transistor T4, a fifth transistor T5, a sixth transistor T6, a seventh transistor T7, a first capacitor C1, a second capacitor C2, and a light emitting element EL (e.g., a light emitting diode).

The first transistor T1 may include a gate electrode connected to a first node N1, a first electrode connected to a second node N2, and a second electrode connected to a third node N3. The first transistor T1 may generate a driving current based on a voltage difference between the second node N2 and the first node N1. The first transistor T1 may be referred as a driving transistor.

In an embodiment, a power line PL transmitting a driving voltage ELVDD may be connected to the second node N2. Accordingly, the first electrode of the first transistor T1 may be directly connected to the power line PL.

The second transistor T2 may include a gate electrode that receives a write gate signal GW, a first electrode connected to a data line DL that transmits the data voltage VDAT, and a second electrode connected to a fourth node N4. The second transistor T2 may transmit the data voltage VDAT to the fourth node N4 in response to the write gate signal GW. The second transistor T2 may be referred as a write transistor.

The third transistor T3 may include a gate electrode that receives a compensation gate signal GC, a first electrode connected to the third node N3, and a second electrode connected to the first node N1. The third transistor T3 may connect the third node N3 to the first node N1 in response to the compensation gate signal GC. The third transistor T3 may be referred as a compensation transistor.

The fourth transistor T4 may include a gate electrode that receives an initialization gate signal GI, a first electrode that receives a first initialization voltage VINT, and a second electrode connected to the first node N1. The fourth transistor T4 may transmit the first initialization voltage VINT to the first node N1 in response to the initialization gate signal GI.

The fifth transistor T5 may include a gate electrode that receives the compensation gate signal GC, a first electrode that receives a reference voltage VREF, and a second electrode connected to the fourth node N4. The fifth transistor T5 may transmit the reference voltage VREF to the fourth node N4 in response to the compensation gate signal GC.

The sixth transistor T6 may include a gate electrode that receives an emission control signal EM, a first electrode connected to the third node N3, and a second electrode connected to an anode of the light emitting element EL (e.g., a light emitting diode). The sixth transistor T6 may connect the third node N3 to the anode of the light emitting diode EL in response to the emission control signal EM.

The seventh transistor T7 may include a gate electrode that receives a bypass gate signal GB, a first electrode that receives a second initialization voltage VAINT, and a second electrode connected to the anode of the light emitting element EL (e.g., light emitting diode). The seventh transistor T7 may transmit the second initialization voltage VAINT to the anode of the light emitting element EL (e.g., light emitting diode) in response to the bypass gate signal GB.

In an embodiment, each of the first transistor T1, the second transistor T2, the third transistor T3, the fourth transistor T4, the fifth transistor T5, the sixth transistor T6, and the seventh transistor T7 may be a P-type transistor. In an embodiment, each of the first transistor T1, the second transistor T2, the third transistor T3, the fourth transistor T4, the fifth transistor T5, the sixth transistor T6, and the seventh transistor T7 may be a polycrystalline silicon transistor.

The first capacitor C1 may be connected between the first node N1 and the second electrode of the second transistor T2. The first capacitor C1 may include a first electrode connected to the first node N1 and a second electrode connected to the fourth node N4.

The second capacitor C2 may be connected between the power line PL and the fourth node N4. The second capacitor C2 may include a first electrode connected to the fourth node N4 and a second electrode connected to the power line PL.

The light emitting element EL (e.g., a light emitting diode) may include the anode connected to the second electrode of the sixth transistor T6 and the second electrode of the seventh transistor T7, and a cathode that receives a common voltage ELVSS. The light emitting element EL (e.g., a light emitting diode) may emit light corresponding to the driving current generated by the first transistor T1.

Figure 3:
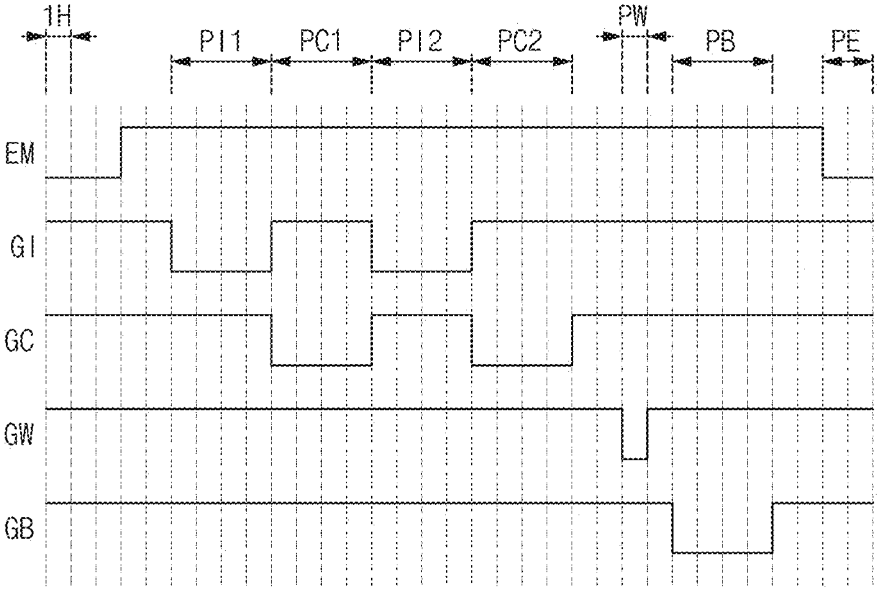
FIG. 3 is a timing diagram for describing one frame period of the pixel of FIG. 2.

FIG. 3 is a timing diagram for describing one frame period during which the pixel PX of FIG. 2 is driven.

Referring to FIG. 3, one frame period of the pixel PX may include a first initialization period PI1, a first compensation period PC1, a second initialization period PI2, a second compensation period PC2, a writing period PW, a bypass period PB, and an emission period PE. The emission control signal EM may have a turn-on voltage level (e.g., logic low level) in the emission period PE, and may have a turn-off voltage level (e.g., logic high level) in the remaining periods excluding the emission period PE.

The initialization gate signal GI may have a turn-on voltage level in the first initialization period PI1 and the second initialization period PI2, and may have a turn-off voltage level in the remaining periods excluding the first initialization period PI1 and the second initialization period PI2. The compensation gate signal GC may have a turn-on voltage level in the first compensation period PC1 and the second compensation period PC2, and may have a turn-off voltage level in the remaining periods excluding the first compensation period PC1 and the second compensation period PC2. In an embodiment, the compensation gate signal GC may be a signal obtained by shifting the initialization gate signal GI by 4 horizontal time periods (4H). For example, the initialization gate signal GI may be delayed by 4 horizontal time periods (4H) to generate the compensation gate signal GC.

The write gate signal GW may have a turn-on voltage level in the writing period PW, and may have a turn-off voltage level in the remaining periods excluding the writing period PW. In an embodiment, the writing period PW is 1 horizontal time period (1H). The bypass gate signal GB may have a turn-on voltage level in the bypass period PB, and may have a turn-off voltage level in the remaining periods excluding the bypass period PB.

FIGS. 4 to 10 are views for describing an operation of the pixel PX of FIG. 2.

Figure 4:
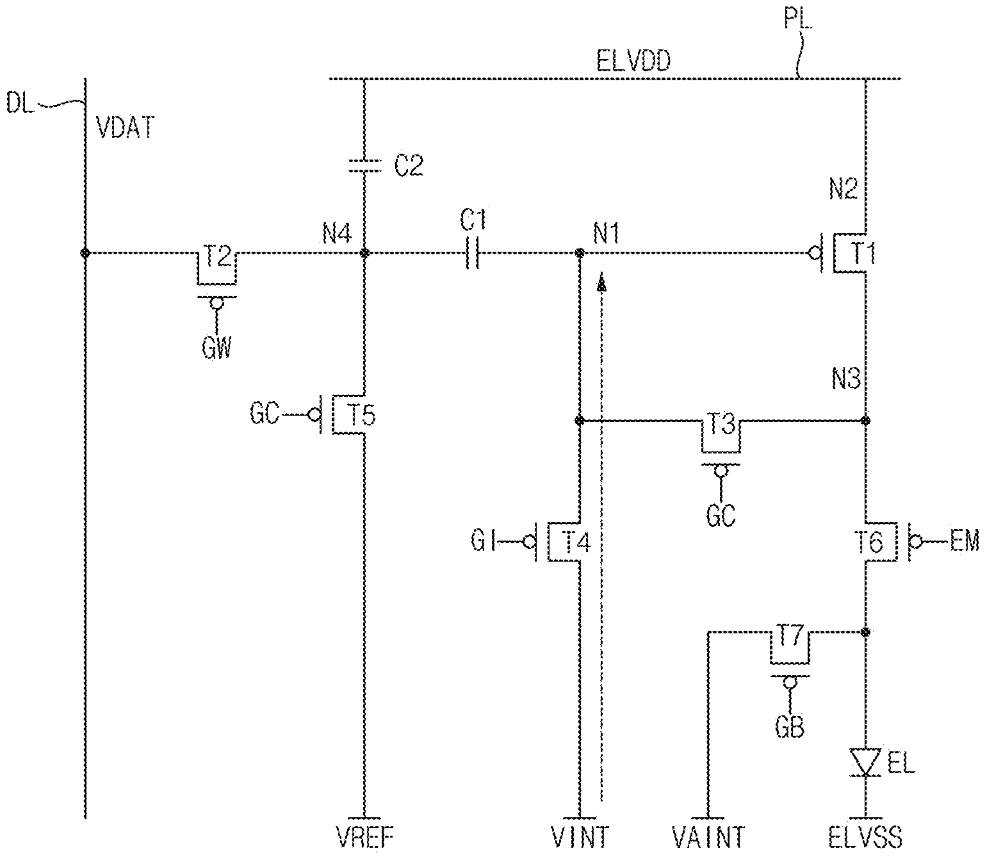
FIGS. 4 to 10 are views for describing an operation of the pixel of FIG. 2.

Referring to FIGS. 3 and 4, the fourth transistor T4 may be turned on in response to the initialization gate signal GI having the turn-on voltage level in the first initialization period PI1, and the first initialization voltage VINT may be transmitted to the first node N1. Accordingly, the gate electrode of the first transistor T1 may be initialized to the first initialization voltage VINT. In the first initialization period PI1, the fourth node N4 may be charged with a data voltage of a previous frame applied during a previous frame period.

Figure 5:
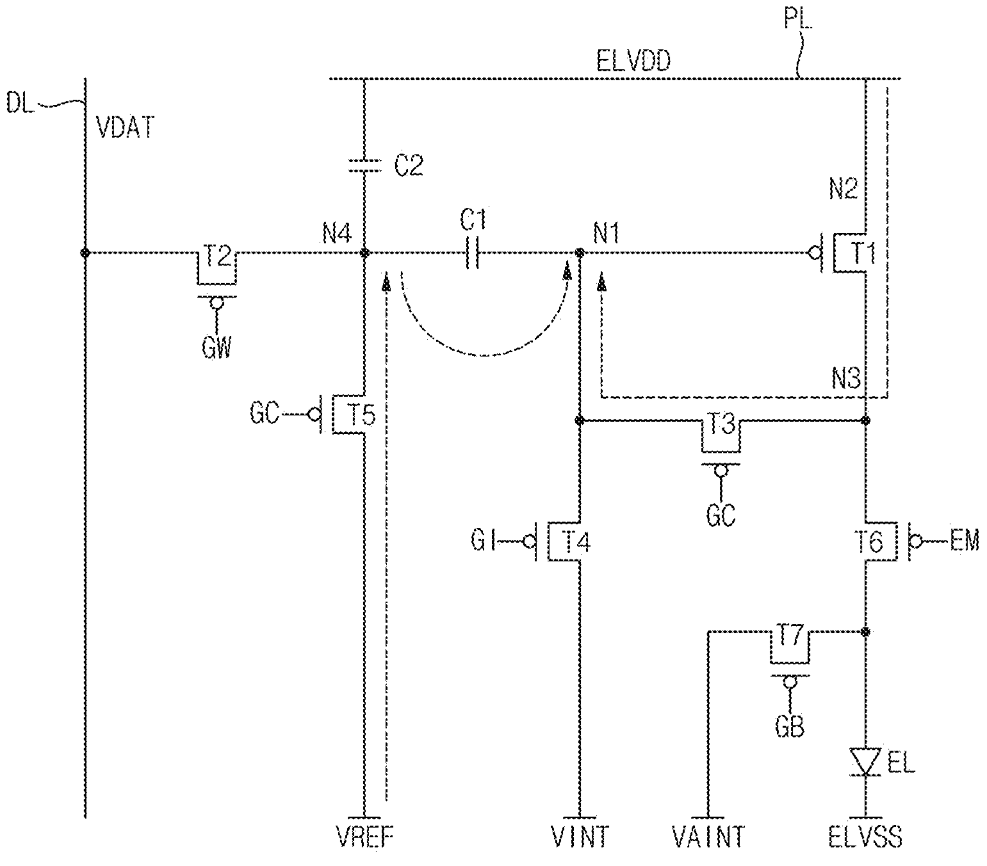

Referring to FIGS. 3 and 5, the third transistor T3 and the fifth transistor T5 may be turned on in response to the compensation gate signal GC having the turn-on voltage level in the first compensation period PC1. A voltage ELVDD−Vth obtained by subtracting a threshold voltage Vth of the first transistor T1 from the driving voltage ELVDD may be transmitted to the first node N1, and the reference voltage VREF may be transmitted to the fourth node N4. A voltage of the fourth node N4 may change from the data voltage of the previous frame to the reference voltage VREF, and the voltage change of the fourth node N4 may affect a voltage of the first node N1 due to a coupling effect of the first capacitor C1. In the first compensation period PC1, the first node N1 may be charged with a voltage of ELVDD−Vth+$\alpha$, where $\alpha$ is a coupling voltage caused by the voltage change of the fourth node N4.

Figure 6:
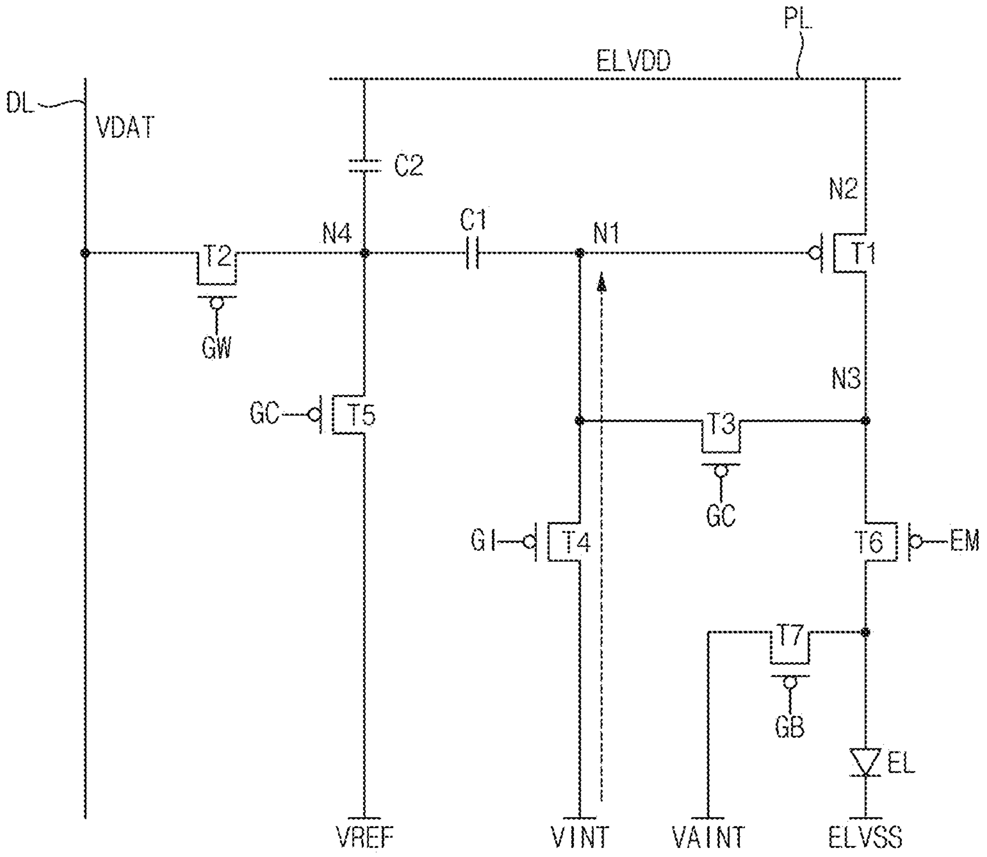

Referring to FIGS. 3 and 6, the fourth transistor T4 may be turned on in response to the initialization gate signal GI having the turn-on voltage level in the second initialization period PI2, and the first initialization voltage VINT may be transmitted to the first node N1. Accordingly, the gate electrode of the first transistor T1 may be initialized again to the first initialization voltage VINT.

Figure 7:
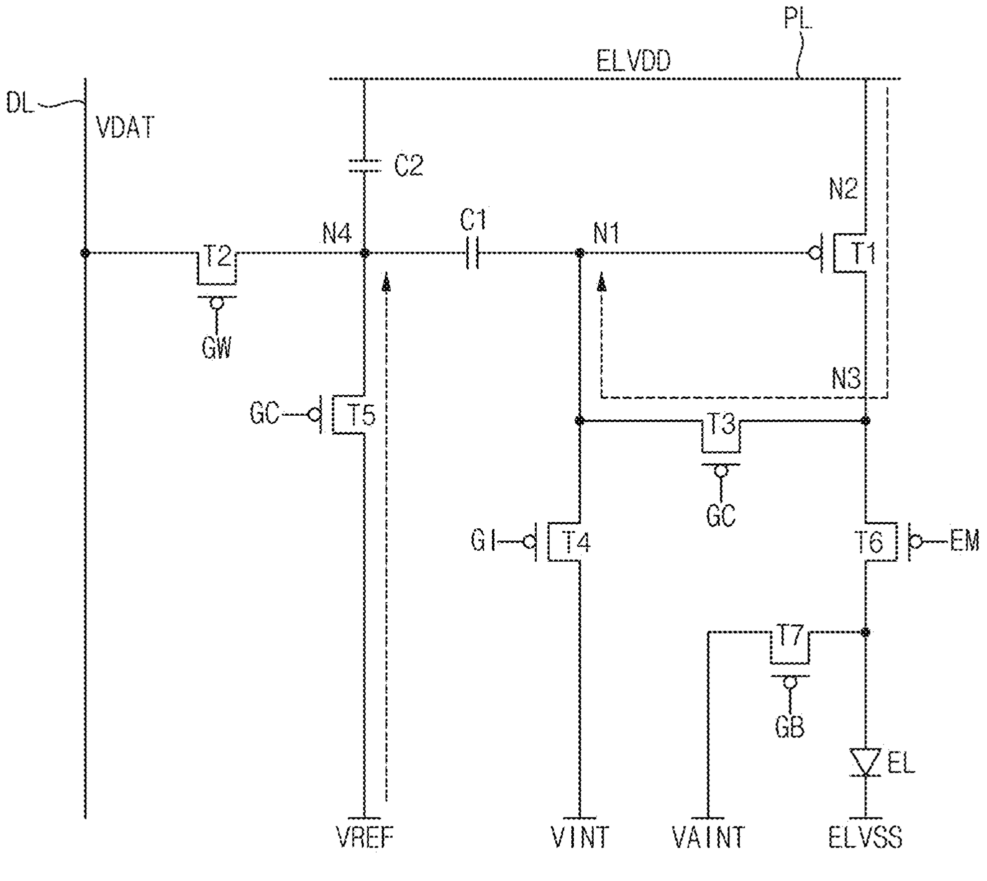

Referring to FIGS. 3 and 7, the third transistor T3 and the fifth transistor T5 may be turned on in response to the compensation gate signal GC having the turn-on voltage level in the second compensation period PC2. A voltage ELVDD−Vth obtained by subtracting the threshold voltage Vth of the first transistor T1 from the driving voltage ELVDD may be transmitted to the first node N1, and the reference voltage VREF may be transmitted to the fourth node N4. Since the voltage VREF of the fourth node N4 does not change, the voltage change of the fourth node N4 should not affect the voltage of the first node N1. In the second compensation period PC2, the first node N1 may be charged with a voltage of ELVDD−Vth. Accordingly, the gate electrode of the first transistor T1 may be charged with the voltage ELVDD−Vth compensated for the threshold voltage Vth of the first transistor T1.

Figure 8:
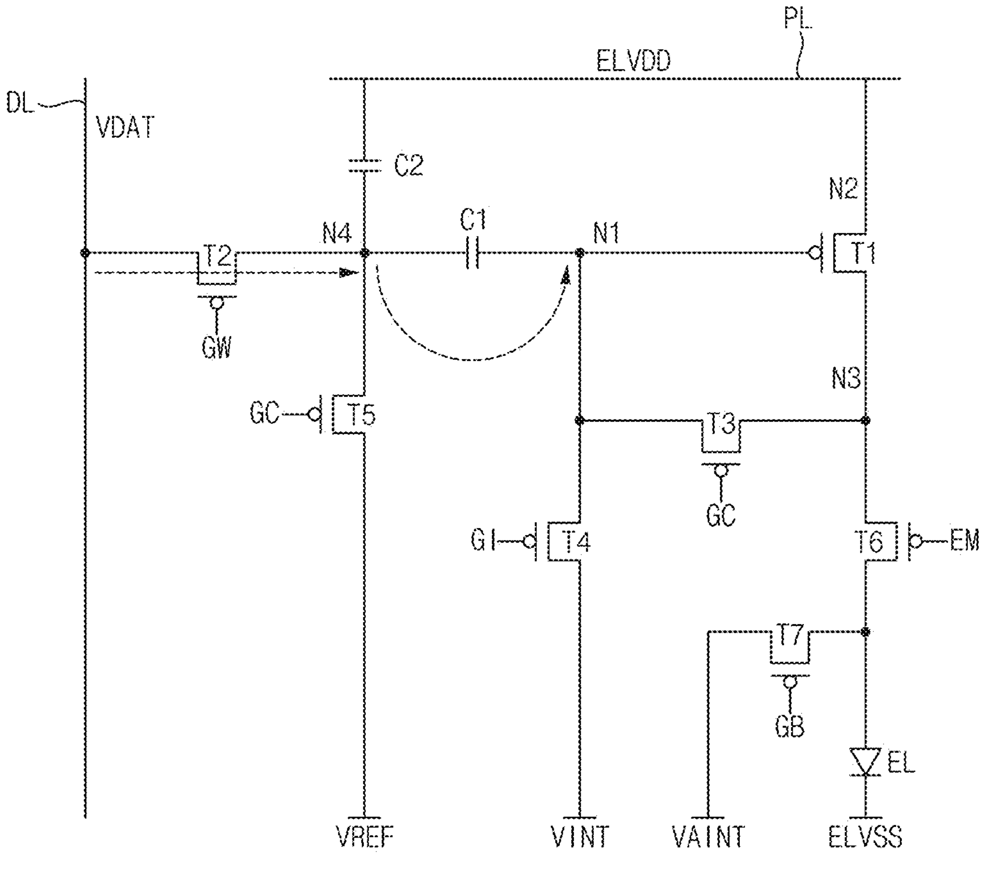

Referring to FIGS. 3 and 8, the second transistor T2 may be turned on in response to the write gate signal GW having the turn-on voltage level in the writing period PW, and the data voltage VDAT may be transmitted to the fourth node N4. The voltage of the fourth node N4 may change from the reference voltage VREF to the data voltage VDAT, and a voltage change amount VDAT−VREF of the fourth node N4 may be transferred to the first node N1 due to the coupling effect of the first capacitor C1. In the writing period PW, the first node N1 may be charged with a voltage of ELVDD−Vth+VDAT−VREF.

Figure 9:
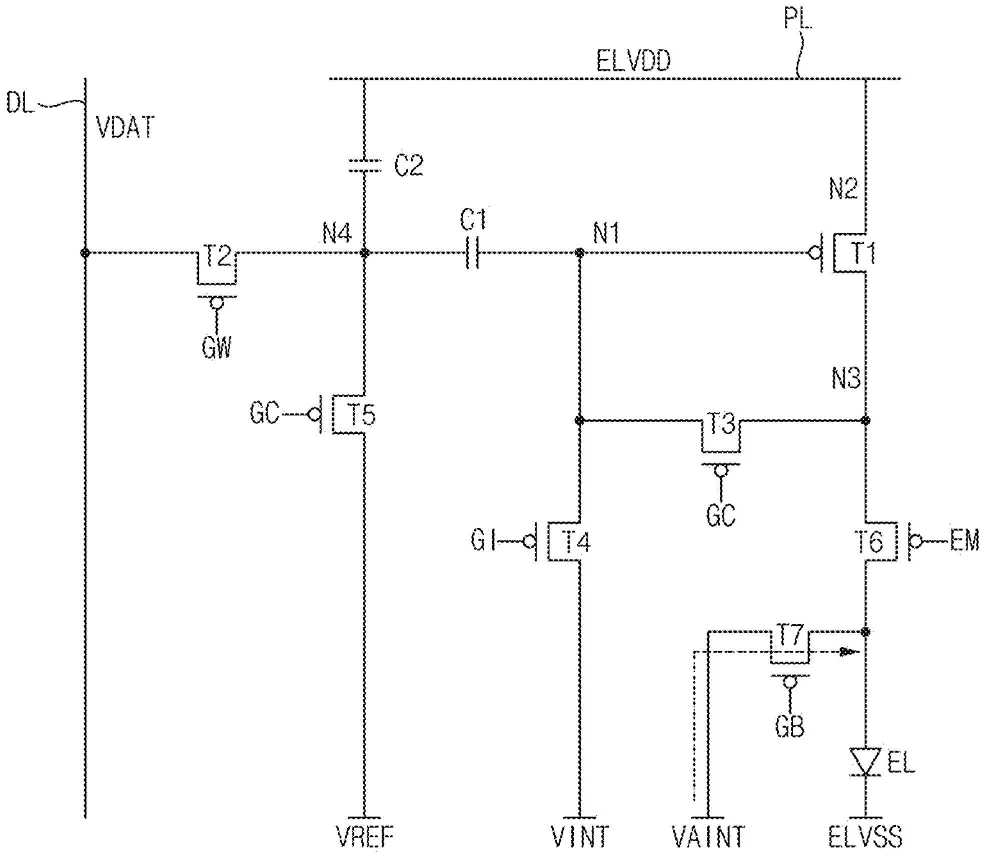

Referring to FIGS. 3 and 9, the seventh transistor T7 may be turned on in response to the bypass gate signal GB having the turn-on voltage level in the bypass period PB, and the second initialization voltage VAINT may be transmitted to the anode the light emitting element EL (e.g., a light emitting diode). Accordingly, the anode of the light emitting element EL (e.g., a light emitting diode) may be initialized to the second initialization voltage VAINT.

Figure 10:
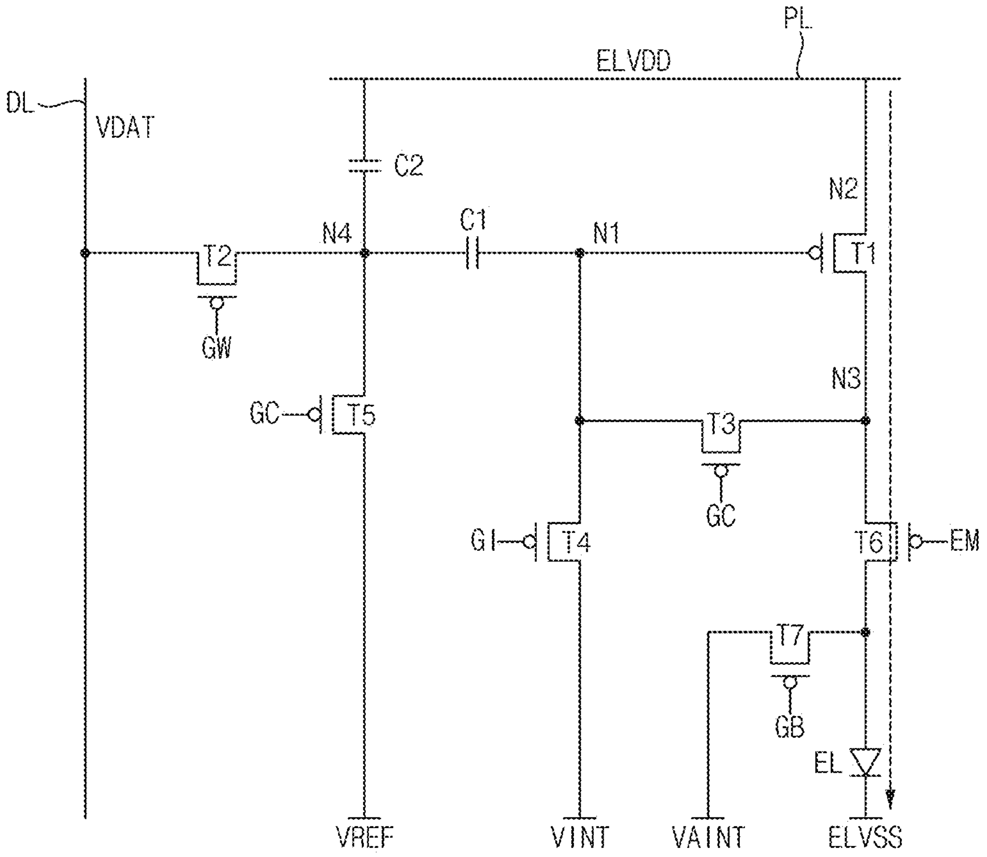

Referring to FIGS. 3 and 10, the sixth transistor T6 may be turned on in response to the emission control signal EM having the turn-on voltage level in the emission period PE, and the first transistor T1 may generate the driving current I calculated by Equation 1.

$$I \propto (Vsg - Vth)^2 \quad \text{[Equation 1]}$$

In Equation 1, Vsg is a source-gate voltage of the first transistor T1. The source-gate voltage Vsg of the first transistor T1 may be a value obtained by subtracting the voltage ELVDD−Vth+VDAT−VREF of the first node N1 from the voltage ELVDD of the second node N2. Accordingly, the driving current I may be calculated by Equation 2.

$$I \propto (VREF - VDAT)^2 \quad \text{[Equation 2]}$$

The driving current I may flow through the light emitting element EL (e.g., a light emitting diode), and the light emitting element EL (e.g., a light emitting diode) may emit light with a luminance corresponding to the data voltage VDAT.

Figure 11:
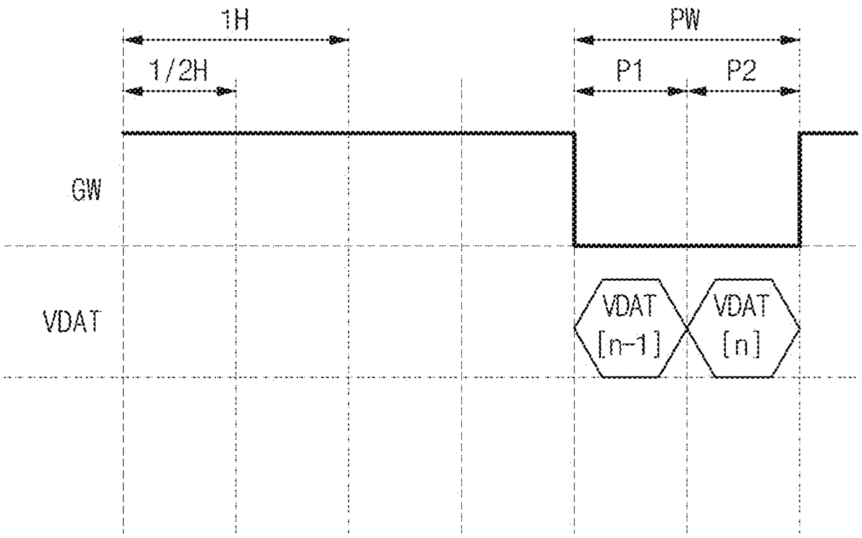
FIG. 11 is a timing diagram for describing a writing period included in the frame period of FIG. 3.

FIG. 11 is a timing diagram for describing the writing period PW included in the frame period of FIG. 3.

Referring to FIGS. 2 and 11, the data line DL may have an $n-1^{th}$ (n is a natural number of 2 or more) data voltage VDAT[n−1] in a first period P1 among the writing period PW, and may have an $n^{th}$ data voltage VDAT[n] in a second period P2 among the writing period PW after the first period P1. In an embodiment, each of the first period P1 and the second period P2 is ½ a horizontal time period (½H). The horizontal time period may be the time taken for image data to be output to one pixel row PR. In the writing period PW, the voltage of the data line DL may be transmitted to the fourth node N4.

The $n-1^{th}$ data voltage VDAT[n−1] may be transmitted to the fourth node N4 in the first period P1. The voltage of the fourth node N4 may change from the reference voltage VREF to the $n-1^{th}$ data voltage VDAT[n−1], and a voltage change amount VDAT[n−1]−VREF of the fourth node N4 may be transmitted to the first node N1 due to the coupling effect of the first capacitor C1. A voltage of ELVDD−Vth may be charged in the first node N1 before the first period P1, and the voltage change amount VDAT[n−1]−VREF of the fourth node N4 may be added to the first node N1 in the first period P1. Accordingly, the first node N1 may be charged with a voltage of ELVDD−Vth+VDAT[n−1]−VREF in the first period P1.

The $n^{th}$ data voltage VDAT[n] may be transmitted to the fourth node N4 in the second period P2. The voltage of the fourth node N4 may change from the $n-1^{th}$ data voltage VDAT[n−1] to the $n^{th}$ data voltage VDAT[n], and a voltage change amount VDAT[n]−VDAT[n−1] of the fourth node N4 may be transmitted to the first node N1 due to the coupling effect of the first capacitor C1. The voltage of ELVDD−Vth+VDAT[n−1]−VREF may be charged in the first node N1 before the second period P2, and the voltage change amount VDAT[n]−VDAT[n−1] of the fourth node N4 may be added to the first node N1 in the second period P2. Accordingly, the first node N1 may be charged with a voltage of ELVDD−Vth+VDAT[n]−VREF in the second period P2.

Although the $n-1^{th}$ data voltage VDAT[n−1] and the $n^{th}$ data voltage VDAT[n] are transmitted to the pixel PX in the writing period PW, the first node N1 may be charged with the voltage of ELVDD−Vth+VDAT[n]−VREF at the end of the writing period PW, and the light emitting element EL (e.g., a light emitting diode) may emit light with a luminance corresponding to the $n^{th}$ data voltage VDAT[n]. In other words, the pixel PX may emit light based on the $n^{th}$ data voltage VDAT[n] regardless of the $n-1^{th}$ data voltage VDAT [n−1].

Although the $n-1^{th}$ data voltage VDAT[n−1] and the $n^{th}$ data voltage VDAT[n] are transmitted in the writing period PW of the pixel PX to which the separated compensation method is applied, since the pixel PX emits light based on the $n^{th}$ data voltage VDAT[n] regardless of the $n-1^{th}$ data voltage VDAT[n−1], the writing period PW may increase from ½ a horizontal time period (½H) to 1 horizontal time period (1H), and a sufficient data writing time may be secured.

Figure 12:
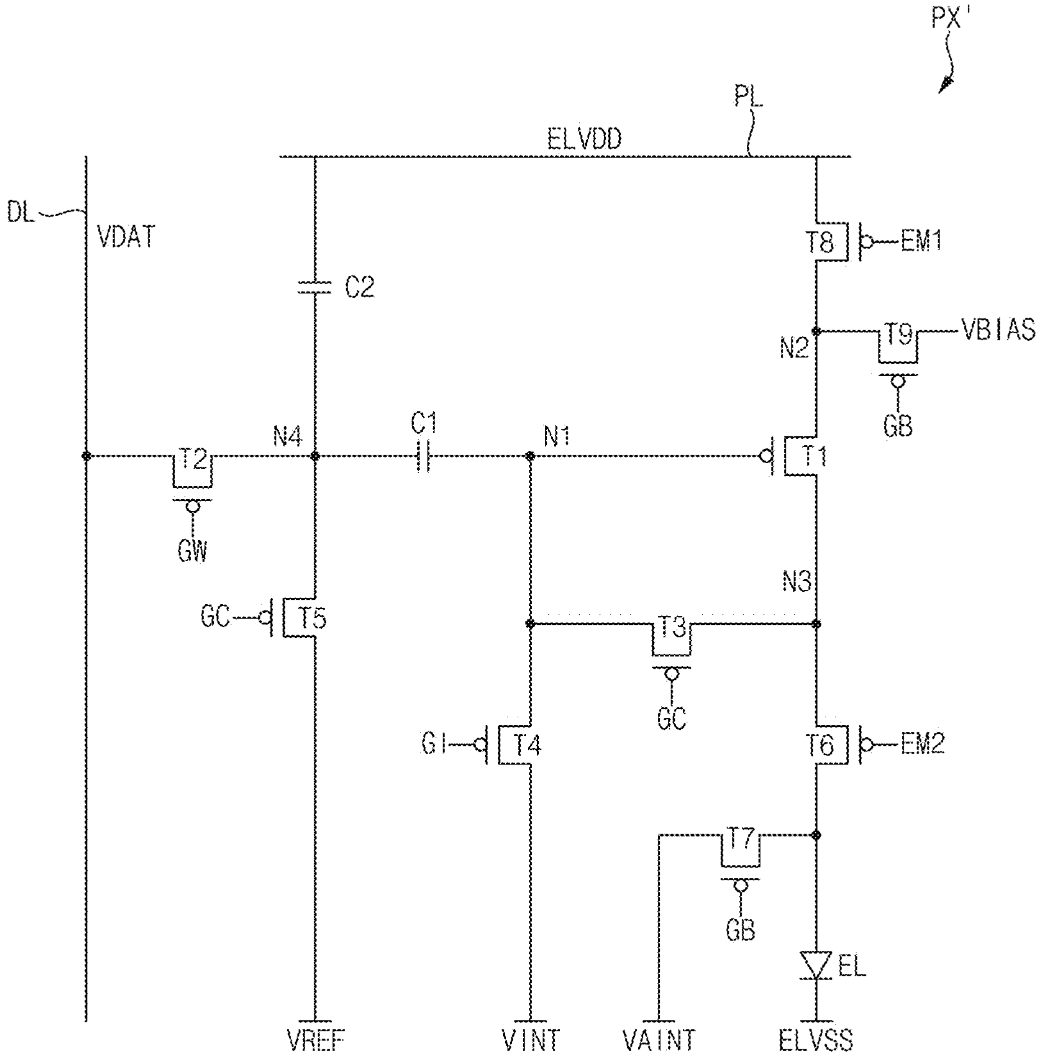
FIG. 12 is a circuit diagram showing an example of a pixel included in the display device of FIG. 1.

FIG. 12 is a circuit diagram showing an example of a pixel PX' included in the display device 100 of FIG. 1. In an embodiment, the pixel PX of FIG. 2 is replaced with the pixel PX'.

Referring to FIG. 12, the pixel PX' may include a first transistor T1, a second transistor T2, a third transistor T3, a fourth transistor T4, a fifth transistor T5, a sixth transistor T6, a seventh transistor T7, an eighth transistor T8, a ninth transistor T9, a first capacitor C1, a second capacitor C2, and a light emitting diode EL. Descriptions of components of the pixel PX' described with reference to FIG. 12, which are substantially the same as or similar to those of the pixel PX described with reference to FIG. 2, will be omitted.

The sixth transistor T6 may include a gate electrode that receives a second emission control signal EM2, a first electrode connected to the third node N3, and a second electrode connected to the anode of the light emitting diode EL. The second emission control signal EM2 may be the same as the emission control signal EM described with reference to FIG. 3. The sixth transistor T6 may connect the third node N3 to the anode of the light emitting element EL (e.g., a light emitting diode) in response to the second emission control signal EM2.

The eighth transistor T8 may include a gate electrode that receives a first emission control signal EM1, a first electrode connected to the power line PL, and a second electrode connected to the second node N2. The first emission control signal EM1 may have a turn-on voltage level in the first initialization period PI1, the first compensation period PC1, the second initialization period PI2, the second compensation period PC2, and the emission period PE, and the first emission control signal EM1 may have a turn-off voltage level in the writing period PW and the bypass period PB. The eighth transistor T8 may transmit the driving voltage ELVDD to the second node N2 in response to the first emission control signal EM1.

The ninth transistor T9 may include a gate electrode that receives the bypass gate signal GB, a first electrode that receives a bias voltage VBIAS, and a second electrode connected to the second node N2. The ninth transistor T9 may transmit the bias voltage VBIAS to the second node N2 in response to the bypass gate signal GB.

In an embodiment, each of the eighth transistor T8 and the ninth transistor T9 may be a P-type transistor. In an embodiment, each of the eighth transistor T8 and the ninth transistor T9 may be a polycrystalline silicon transistor.

Figure 13:
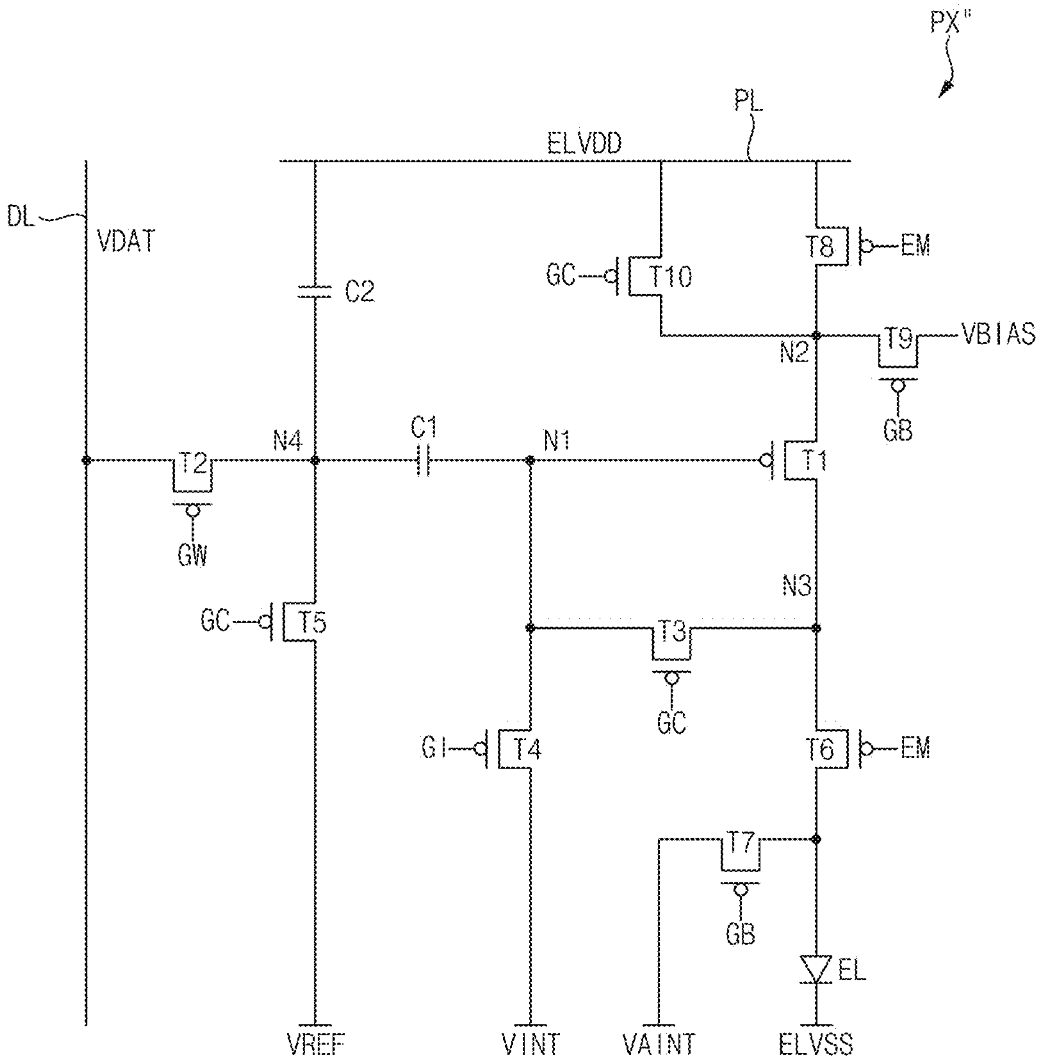
FIG. 13 is a circuit diagram showing an example of a pixel included in the display device of FIG. 1.

FIG. 13 is a circuit diagram showing an example of a pixel PX" included in the display device 100 of FIG. 1. In an embodiment, the pixel PX of FIG. 2 is replaced with the pixel PX".

Referring to FIG. 13, the pixel PX" may include a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, a first capacitor C1, a second capacitor C2, and a light emitting diode EL. Descriptions of components of the pixel PX" described with reference to FIG. 13, which are substantially the same as or similar to those of the pixel PX described with reference to FIG. 2, will be omitted.

The eighth transistor T8 may include a gate electrode that receives the emission control signal EM, a first electrode connected to the power line PL, and a second electrode connected to the second node N2. The eighth transistor T8 may transmit the driving voltage ELVDD to the second node N2 in response to the emission control signal EM.

The ninth transistor T9 may include a gate electrode that receives the bypass gate signal GB, a first electrode that receives the bias voltage VBIAS, and a second electrode connected to the second node N2. The ninth transistor T9 may transmit the bias voltage VBIAS to the second node N2 in response to the bypass gate signal GB.

The tenth transistor T10 may include a gate electrode that receives the compensation gate signal GC, a first electrode connected to the power line PL, and a second electrode connected to the second node N2. The tenth transistor T10 may transmit the driving voltage ELVDD to the second node N2 in response to the compensation gate signal GC.

In an embodiment, each of the eighth transistor T8, the ninth transistor T9, and the tenth transistor T10 may be a P-type transistor. In an embodiment, each of the eighth transistor T8, the ninth transistor T9, and the tenth transistor T10 may be a polycrystalline silicon transistor.

Figure 14:
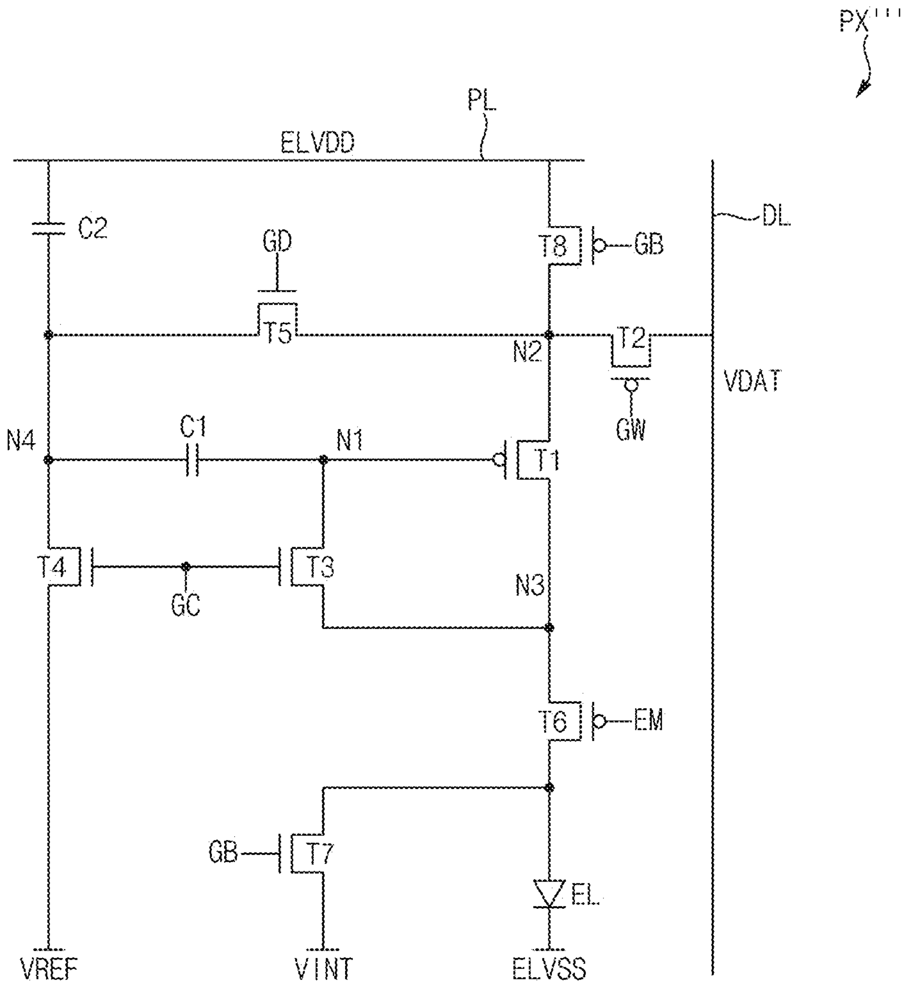
FIG. 14 is a circuit diagram showing an example of a pixel included in the display device of FIG. 1.

FIG. 14 is a circuit diagram showing an example of a pixel PX''' included in the display device 100 of FIG. 1. In an embodiment, the pixel PX of FIG. 2 is replaced with the pixel PX''.

Referring to FIG. 14, the pixel PX''' may include a first transistor T1, a second transistor T2, a third transistor T3, a fourth transistor T4, a fifth transistor T5, a sixth transistor T6, a seventh transistor T7, an eighth transistor T8, a first capacitor C1, a second capacitor C2, and a light emitting diode EL. Descriptions of components of the pixel PX" " described with reference to FIG. 14, which are substantially the same as or similar to those of the pixel PX described with reference to FIG. 2, will be omitted.

The second transistor T2 may include a gate electrode that receives the write gate signal GW, a first electrode connected to the data line DL that transmits the data voltage VDAT, and a second electrode connected to the second node N2. The second transistor T2 may transmit the data voltage VDAT to the second node N2 in response to the write gate signal GW.

The fourth transistor T4 may include a gate electrode that receives the compensation gate signal GC, a first electrode that receives the reference voltage VREF, and a second electrode connected to the fourth node N4. The fourth transistor T4 may transmit the reference voltage VREF to the fourth node N4 in response to the compensation gate signal GC.

The fifth transistor T5 may include a gate electrode that receives a subsequent compensation gate signal GD, a first electrode connected to the second node N2, and a second electrode connected to the fourth node N4. In an embodiment, the subsequent compensation gate signal GD may be a signal obtained by shifting the compensation gate signal GC by a predetermined horizontal time period. The fifth transistor T5 may connect the second node N2 to the fourth node N4 in response to the subsequent compensation gate signal GD.

The seventh transistor T7 may include a gate electrode that receives the bypass gate signal GB, a first electrode that receives the first initialization voltage VINT, and a second electrode connected to the anode of the light emitting diode EL. The seventh transistor T7 may transmit the first initialization voltage VINT to the anode of the light emitting element EL (e.g., a light emitting diode) in response to the bypass gate signal GB.

The eighth transistor T8 may include a gate electrode that receives the bypass gate signal GB, a first electrode connected to the power line PL, and a second electrode connected to the second node N2. The eighth transistor T8 may transmit the driving voltage ELVDD to the second node N2 in response to the bypass gate signal GB.

In an embodiment, each of the first transistor T1, the second transistor T2, the sixth transistor T6, and the eighth transistor T8 may be a P-type transistor, and each of the third transistor T3, the fourth transistor T4, the fifth transistor T5, and the seventh transistor T7 may be an N-type transistor. In an embodiment, each of the first transistor T1, the second transistor T2, the sixth transistor T6, and the eighth transistor T8 may be a polycrystalline silicon transistor, and each of the third transistor T3, the fourth transistor T4, the fifth transistor T5, and the seventh transistor T7 may be an oxide semiconductor transistor.

Figure 15:
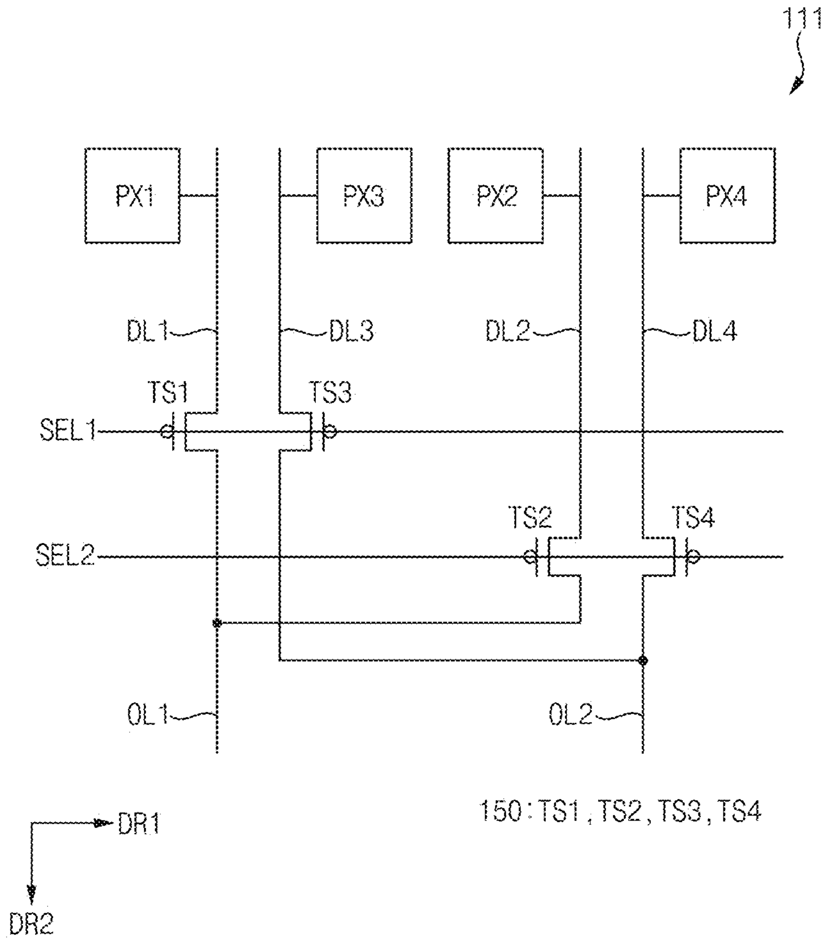
FIG. 15 is a view showing an example of a display panel included in the display device of FIG. 1.

FIG. 15 is a view showing an example of part of a display panel 111 included in the display device 100 of FIG. 1. In an embodiment, the part is used to implement part of the display panel 110 of FIG. 1.

Referring to FIG. 15, a first pixel PX1, a third pixel PX3, a second pixel PX2, and a fourth pixel PX4 may be arranged along the first direction DR1 in one pixel row. In an embodiment, the first pixel PX1 is one of a red pixel and a blue pixel, the second pixel PX2 is one of the red pixel and the blue pixel different from the first pixel PX1, and each of the third pixel PX3 and the fourth pixel PX4 are a green pixel. For example, when the first pixel PX1 is the red pixel, the second pixel PX2 may be the blue pixel.

A first data line DL1, a third data line DL3, a second data line DL2, and a fourth data line DL4 may be arranged along the first direction DR1. In an embodiment, the first data line DL1, the second data line DL2, the third data line DL3, and the fourth data line DL4 may be connected to the first pixel PX1, the second pixel PX2, the pixel PX3, and the fourth pixel PX4, respectively.

In an embodiment, the first data line DL1 and the third data line DL3 are disposed between the first pixel PX1 and the third pixel PX3, and the second data line DL2 and the fourth data line DL4 are disposed between the second pixel PX2 and the fourth pixel PX4. The first pixel PX1 and the third pixel PX3 may have symmetrical shapes to each other with an imaginary line disposed between the first data line DL1 and the third data line DL3 and extending in the second direction DR2 in between. The first data line DL1 and the third data line DL3 may be disposed between the first pixel PX1 and the third pixel PX3, and the first pixel PX1 and the third pixel PX3 may have symmetrical shapes to each other with the imaginary line in between, so that pixels per inch (PPI) of the pixels included in the display panel 111 may increase.

In an embodiment, a gap between the third data line DL3 and the second data line DL2 is greater than a gap between the first data line DL1 and the third data line DL3. In an embodiment, a gap between the second data line DL2 and the fourth data line DL4 is equal to or substantially equal to the gap between the first data line DL1 and the third data line DL3. In an embodiment, the distance between third data line DL3 and the second data line DL2 in the first direction DR1 is greater than the distance between the first data line DL1 and the third data line DL3 in the first direction DR1. In an embodiment, a distance between the second data line DL2 and the fourth data line DL4 in the first direction DR1 is equal to or substantially equal to the distance between the first data line DL1 and the third data line DL3 in the first direction DR1.

A first output line OL1 and a second output line OL2 may extend in the second direction DR2 and may be spaced apart from one another in the first direction DR1.

In an embodiment, the demultiplexer 150 selectively connects the first data line DL1 and the second data line DL2 to the first output line OL1, and selectively connects the third data line DL3 and the fourth data line DL4 to the second output line OL2. In an embodiment, the demultiplexer 150 includes a first selection transistor TS1, a second selection transistor TS2, a third selection transistor TS3, and a fourth selection transistor TS4.

The first selection transistor TS1 may connect the first data line DL1 to the first output line OL1 in response to a first selection signal SEL1. For example, the controller 160 may apply the first selection signal SEL1 to a gate of the first selection transistor TS1. The second selection transistor TS2 may connect the second data line DL2 to the first output line OL1 in response to a second selection signal SEL2. For example, the controller 160 may apply the second selection signal SEL2 to a gate of the second selection transistor TS2. The third selection transistor TS3 may connect the third data line DL3 to the second output line OL2 in response to the first selection signal SEL1. For example, the controller 160 may apply the first selection signal SEL1 to a gate of the third selection transistor TS3. The fourth selection transistor TS4 may connect the fourth data line DL4 to the second output line OL2 in response to the second selection signal SEL2. For example, the controller 160 may apply the second selection signal SEL2 to a gate of the fourth selection transistor TS4.

Figure 16:
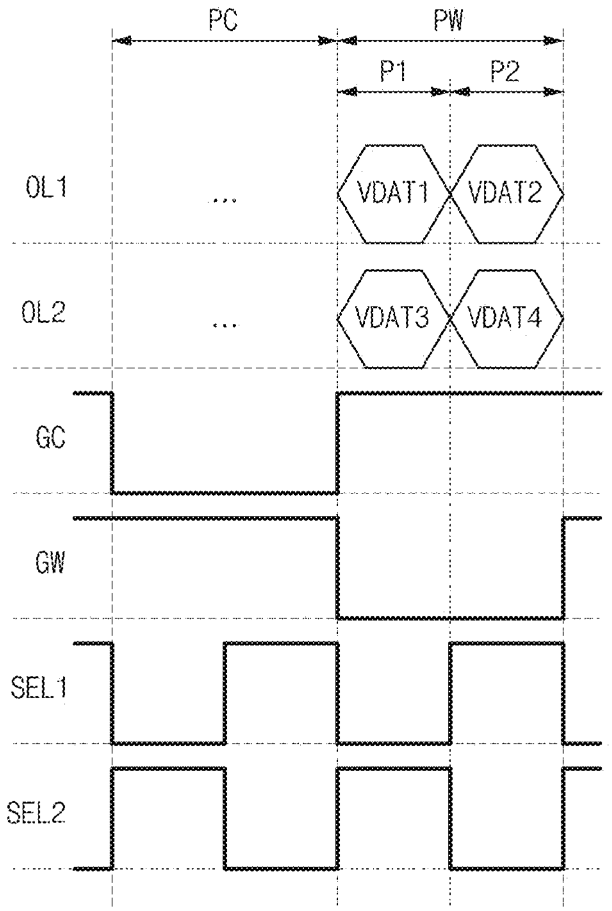
FIGS. 16 to 18 are views for describing an operation of the display panel of FIG. 15.
Figure 17:
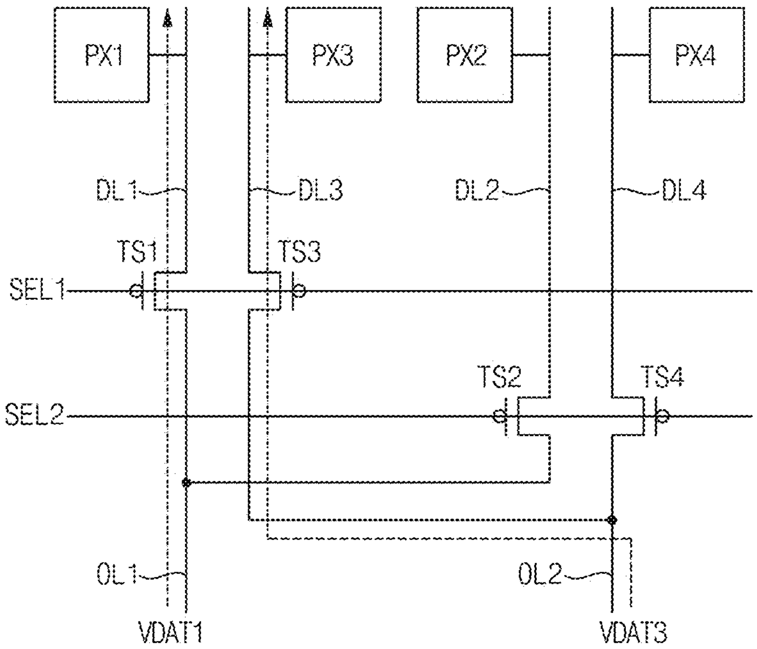
Figure 18:
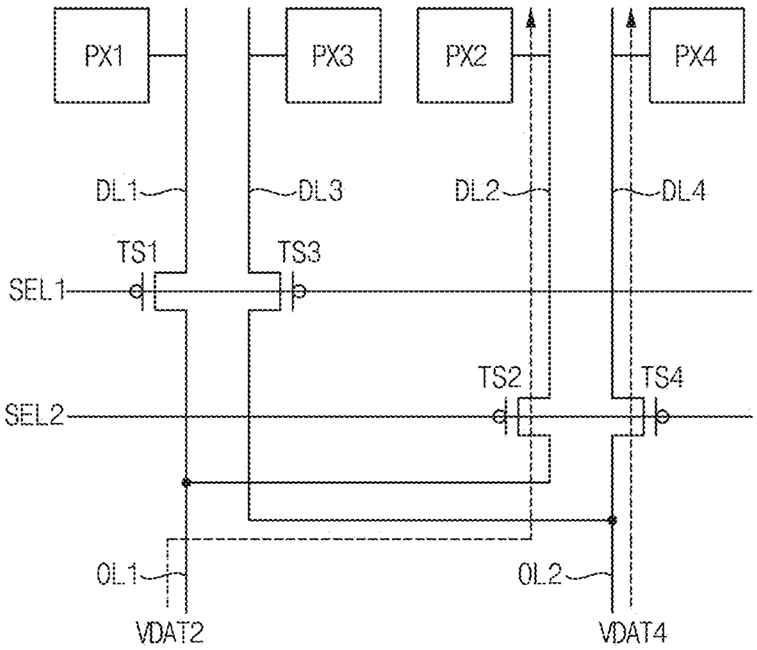

FIGS. 16 to 18 are views for describing an operation of the display panel 111 of FIG. 15. FIG. 16 shows the compensation period PC and the writing period PW.

Referring to FIG. 16, the first output line OL1 outputs a first data voltage VDAT1 in the first period P1, and outputs a second data voltage VDAT2 in the second period P2. The second output line OL2 outputs a third data voltage VDAT3 in the first period P1, and outputs a fourth data voltage VDAT4 in the second period P2. The first selection signal SEL1 has a turn-on voltage level in the first period P1, and has a turn-off voltage level in the second period P2. The second selection signal SEL2 has a turn-off voltage level in the first period P1, and has a turn-on voltage level in the second period P2.

A voltage ELVDD−Vth obtained by subtracting the threshold voltage Vth of the first transistor T1 from the driving voltage ELVDD may be transmitted to the first node N1 of each of the first pixel PX1, the second pixel PX2, the third pixel PX3, and the fourth pixel PX4 in response to the compensation gate signal GC having the turn-on voltage level in the compensation period PC.

Referring to FIGS. 16 and 17, the first selection transistor TS1 and the third selection transistor TS3 may be turned on in response to the first selection signal SEL1 having the turn-on voltage level in the first period P1. The first data voltage VDAT1 output from the first output line OL1 may be applied to the first data line DL1, and the third data voltage VDAT3 output from the second output line OL2 may be applied to the third data line DL3. The second selection transistor TS2 and the fourth selection transistor TS4 may be turned off in response to the second selection signal SEL2 having the turn-off voltage level in the first period P1. The second data line DL2 and the fourth data line DL4 may be floated, and each of the second data line DL2 and the fourth data line DL4 may be charged with a previous data voltage transmitted in the compensation period PC. For example, the second data line DL2 and the fourth data line DL4 may be left in a floating state when the second selection transistor TS2 and the fourth selection transistor TS4 are turned off. In response to the write gate signal GW having the turn-on voltage level in the first period P1, the first data voltage VDAT1 applied to the first data line DL1 may be transmitted to the fourth node N4 of the first pixel PX1, the third data voltage VDAT3 applied to the third data line DL3 may be transmitted to the fourth node N4 of the third pixel PX3, the previous data voltage charged in the second data line DL2 may be transmitted to the fourth node N4 of the second pixel PX2, and the previous data voltage charged in the fourth data line DL4 may be transmitted to the fourth node N4 of the fourth pixel PX4.

Referring to FIGS. 16 and 18, the second selection transistor TS2 and the fourth selection transistor TS4 may be turned on in response to the second selection signal SEL2 having the turn-on voltage level in the second period P2. The second data voltage VDAT2 output from the first output line OL1 may be applied to the second data line DL2, and the fourth data voltage VDAT4 output from the second output line OL2 may be applied to the fourth data line DL4. The first selection transistor TS1 and the third selection transistor TS3 may be turned off in response to the first selection signal SEL1 having the turn-off voltage level in the second period P2. The first data line DL1 and the third data line DL3 may be floated, the first data line DL1 may be charged with the first data voltage VDAT1, and the third data line DL3 may be charged with the third data voltage VDAT3. For example, the first data line DL1 and the third data line DL3 may be left in a floating state when the first selection transistor TS1 and the third selection transistor TS3 are turned off. In response to the write gate signal GW having the turn-on voltage level in the second period P2, the first data voltage VDAT1 charged in the first data line DL1 may be transmitted to the fourth node N4 of the first pixel PX1, the third data voltage VDAT3 charged in the third data line DL3 may be transmitted to the fourth node N4 of the third pixel PX3, the second data voltage VDAT2 applied to the second data line DL2 may be transmitted to the fourth node N4 of the second pixel PX2, and the fourth data voltage VDAT4 applied to the fourth data line DL4 may be transmitted to the fourth node N4 of the fourth pixel PX4.

FIGS. 19 to 22 are views for describing an operation of the first pixel PX1 and the second pixel PX2 included in the display panel 111 of FIG. 15.

Figure 19:
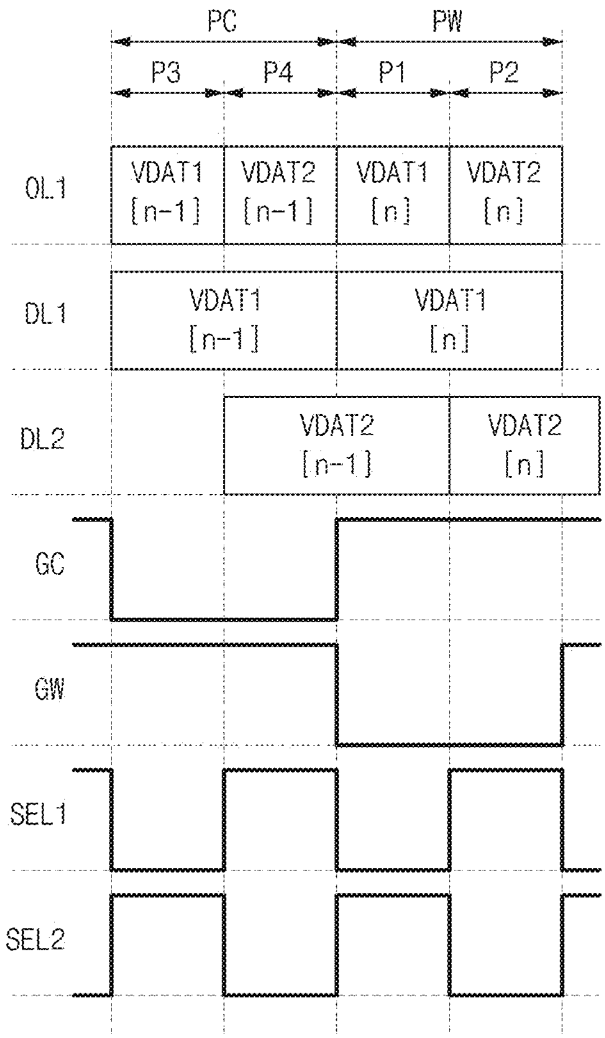
FIGS. 19 to 22 are views for describing an operation of a first pixel and a second pixel included in the display panel of FIG. 15.

Referring to FIG. 19, the compensation period PC includes a third period P3 and a fourth period P4. The first output line OL1 outputs an $n-1^{th}$ first data voltage VDAT1[$n-1$] in the third period P3, outputs an $n-1^{th}$ second data voltage VDAT2[$n-1$] in the fourth period P4, outputs an $n^{th}$ first data voltage VDAT1[$n$] in the first period P1, and outputs an $n^{th}$ second data voltage VDAT2[$n$] in the second period P2. The first data line DL1 may be charged with the $n-1^{th}$ first data voltage VDAT1[$n-1$] in the third period P3 and the fourth period P4, and may be charged with the $n^{th}$ first data voltage VDAT1[$n$] in the first period P1 and the second period P2. The second data line DL2 may be charged with the $n-1^{th}$ second data voltage VDAT2[$n-1$] in the fourth period P4 and the first period P1, and may be charged with the $n^{th}$ second data voltage VDAT2[$n$] in the second period P2.

In an embodiment, a time period during which the compensation gate signal GC and the write gate signal GW have the turn-on voltage level is greater than a time period during which the first selection signal SEL1 and the second selection signal SEL2 have the turn-on voltage level. In an embodiment, a time period during which the compensation gate signal GC and the write gate signal GW have the turn-on voltage level is twice or about twice time a period during which the first selection signal SEL1 and the second selection signal SEL2 have the turn-on voltage level.

Figure 20:
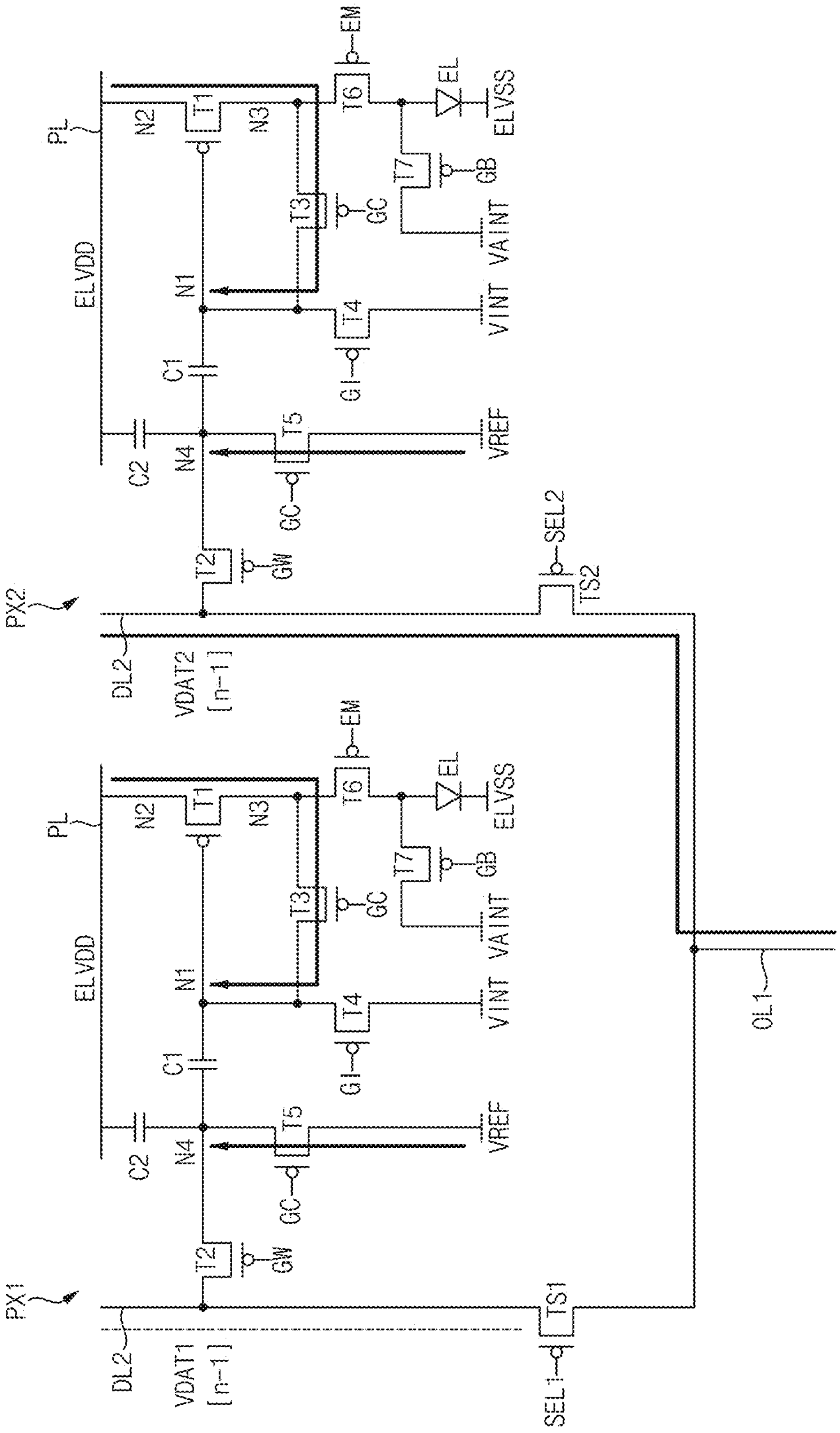

Referring to FIGS. 19 and 20, in response to the compensation gate signal GC having the turn-on voltage level in the compensation period PC, the voltage ELVDD−Vth obtained by subtracting the threshold voltage Vth of the first transistor T1 from the driving voltage ELVDD may be transmitted to the first node N1 of each of the first pixel PX1 and the second pixel PX2, and the reference voltage VREF may be transmitted to the fourth node N4 of each of the first pixel PX1 and the second pixel PX2. Accordingly, the threshold voltage Vth of the first transistor T1 of each of the first pixel PX1 and the second pixel PX2 may be compensated using the driving voltage ELVDD in the compensation period PC before the writing period PW. Further, the $n-1^{th}$ second data voltage VDAT2[$n$−1] may be applied to the second data line DL2 in the fourth period P4.

Figure 21:
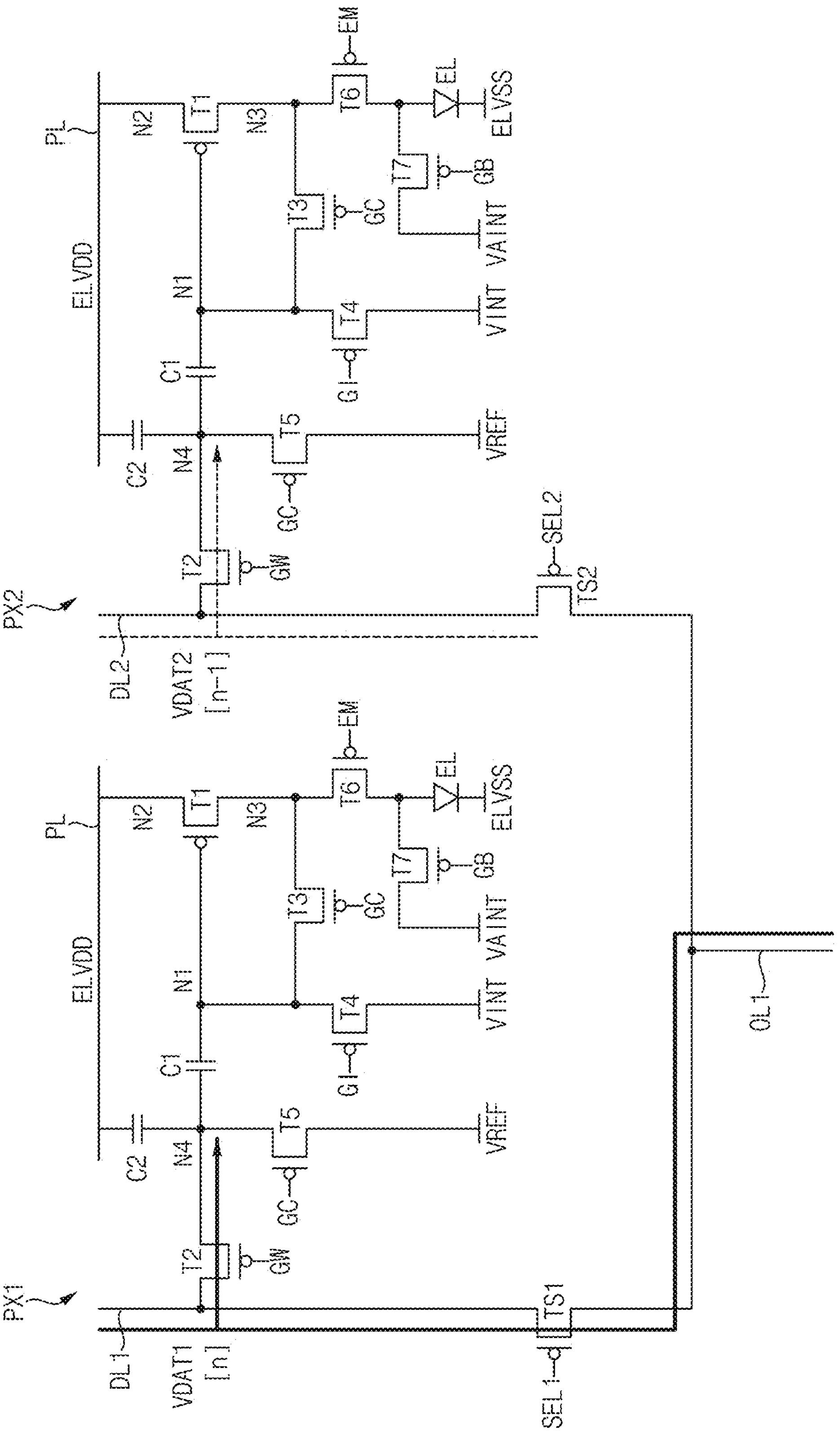

Referring to FIGS. 19 and 21, in the first period P1, the $n^{th}$ first data voltage VDAT1[$n$] may be applied to the first data line DL1, the $n^{th}$ first data voltage VDAT1[$n$] may be transmitted to the fourth node N4 of the first pixel PX1 in response to the write gate signal GW having the turn-on voltage level, and a voltage of ELVDD−Vth+VDAT1[$n$]−VREF may be charged in the first node N1 of the first pixel PX1 due to the coupling effect of the first capacitor C1. In the first period P1, the $n-1^{th}$ second data voltage VDAT2 [$n$−1] applied to the second data line DL2 in the fourth period P4 may be transmitted to the fourth node N4 of the second pixel PX2 in response to the write gate signal GW having the turn-on voltage level, and a voltage of ELVDD−Vth+VDAT2[$n$−1]−VREF may be charged in the first node N1 of the second pixel PX2 due to the coupling effect of the first capacitor C1.

Figure 22:
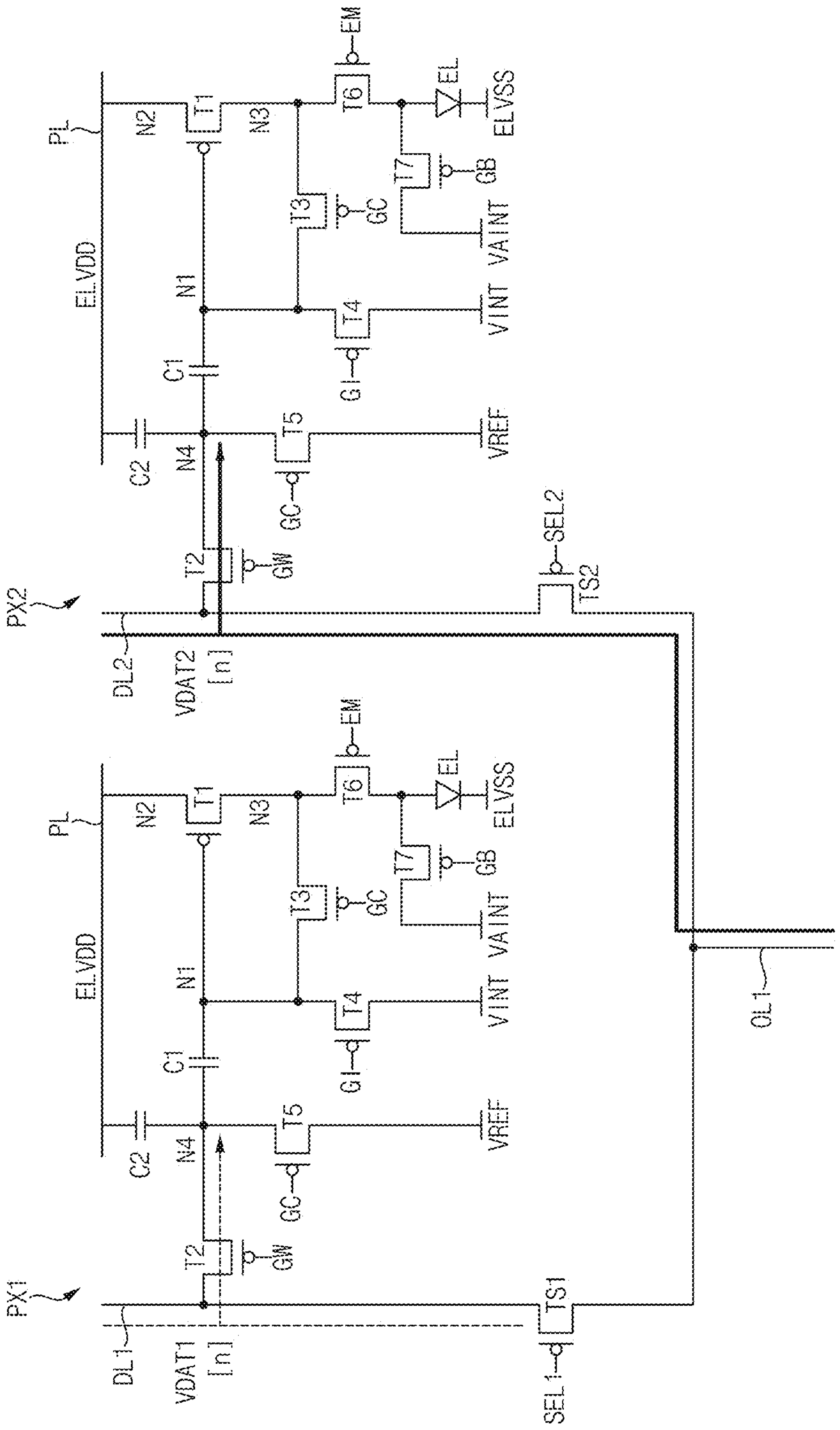

Referring to FIGS. 19 and 22, in the second period P2, the voltage of the first data line DL1 may be maintained at the $n^{th}$ first data voltage VDAT1[$n$], and the voltage of ELVDD−Vth+VDAT1[$n$]−VREF may be maintained at the first node N1 of the first pixel PX1. In the second period P2, the $n^{th}$ second data voltage VDAT2[$n$] may be applied to the second data line DL2, the $n^{th}$ second data voltage VDAT2[$n$] may be transmitted to the fourth node N4 of the second pixel PX2 in response to the write gate signal GW having the turn-on voltage level, and a voltage of ELVDD−Vth+VDAT2[$n$]−VREF may be charged in the first node N1 of the second pixel PX2 due to the coupling effect of the first capacitor C1.

Figure 23:
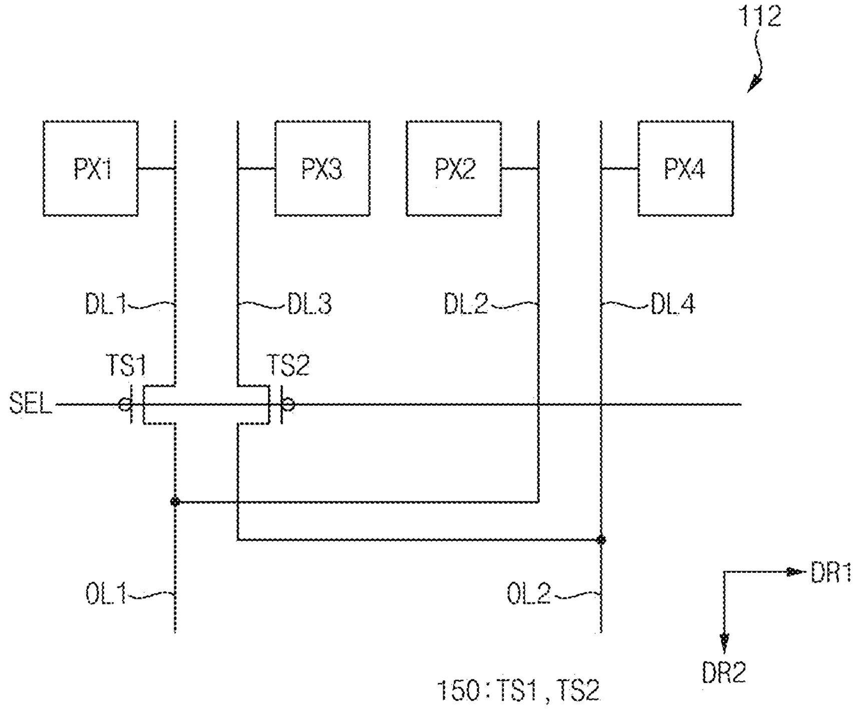
FIG. 23 is a view showing an example of a display panel included in the display device of FIG. 1.

FIG. 23 is a view showing an example of part of a display panel 112 included in the display device of FIG. 1. Descriptions of components of the display panel 112 described with reference to FIG. 23, which are substantially the same as or similar to those of the display panel 111 described with reference to FIG. 15, will be omitted. The part of the display panel 112 may be used to implement a part of the display panel 110.

Referring to FIG. 23, the demultiplexer 150 may selectively connect the first data line DL1 to the first output line OL1, and may selectively connect the third data line DL3 to the second output line OL2. In an embodiment, the second data line DL2 is directly connected to the first output line OL1, and the fourth data line DL4 is directly connected to the second output line OL2. In an embodiment, the demultiplexer 150 includes a first selection transistor TS1 and a second selection transistor TS2.

The first selection transistor TS1 may connect the first data line DL1 to the first output line OL1 in response to a selection signal SEL. The second selection transistor TS2 may connect the third data line DL3 to the second output line OL2 in response to the selection signal SEL. The controller 160 may provide the selection signal SEL.

Figure 24:
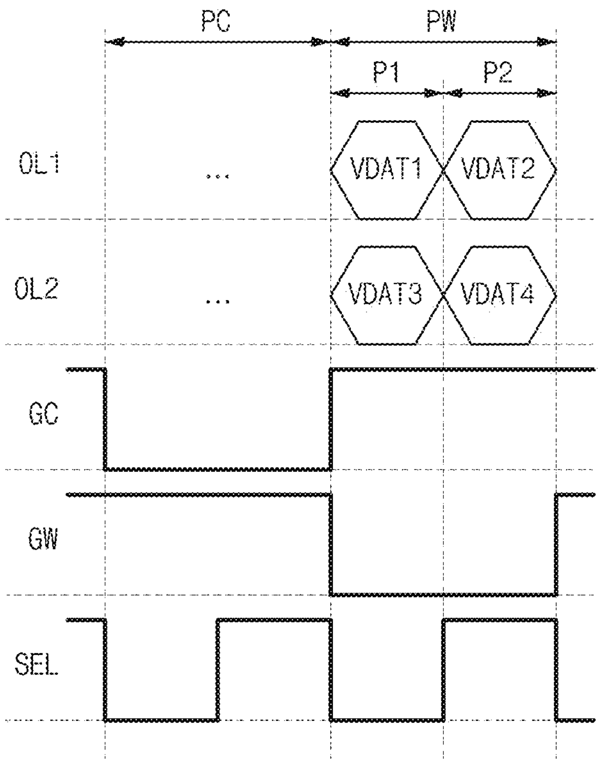
FIGS. 24 to 26 are views for describing an operation of the display panel of FIG. 23.
Figure 25:
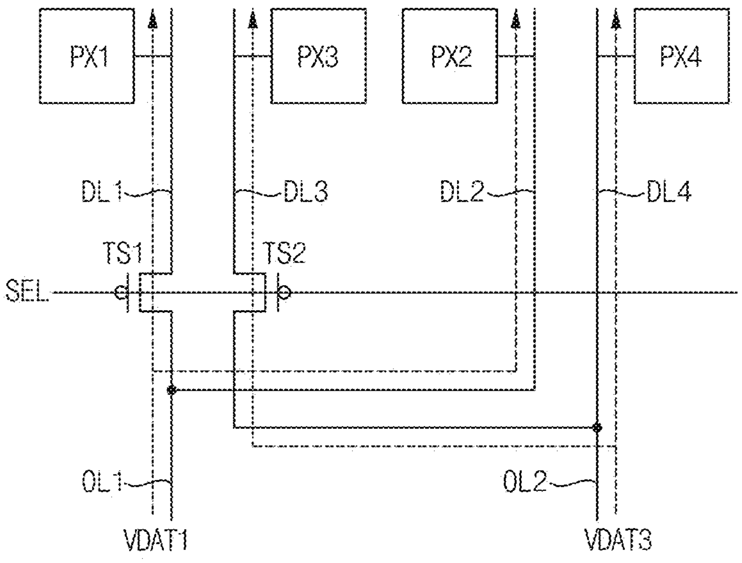
Figure 26:
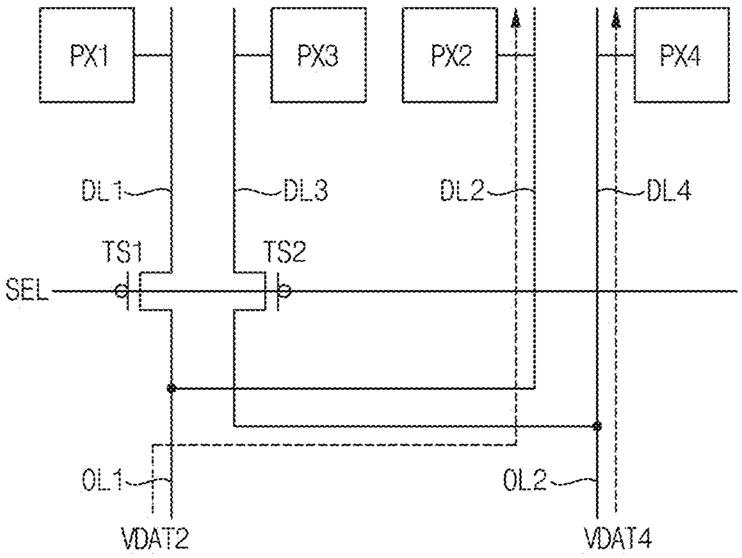

FIGS. 24 to 26 are views for describing an operation of the display panel 112 of FIG. 23. FIG. 24 shows the compensation period PC and the writing period PW. Descriptions of steps of the operation of the display panel 112 described with reference to FIGS. 24 to 26, which are substantially the same as or similar to those of the operation of the display panel 111 described with reference to FIGS. 16 to 18, will be omitted.

Referring to FIG. 24, the selection signal SEL has a turn-on voltage level in the first period P1, and has a turn-off voltage level in the second period P2.

Referring to FIGS. 24 and 25, the first selection transistor TS1 and the second selection transistor TS2 are turned on in response to the selection signal SEL having the turn-on voltage level in the first period P1. The first data voltage VDAT1 output from the first output line OL1 is applied to the first data line DL1 and the second data line DL2, and the second data voltage VDAT2 output from the second output line OL2 is applied to the third data line DL3 and the fourth data line DL4. In response to the write gate signal GW having the turn-on voltage level in the first period P1, the first data voltage VDAT1 applied to the first data line DL1 may be transmitted to the fourth node N4 of the first pixel PX1, the third data voltage VDAT3 applied to the third data line DL3 may be transmitted to the fourth node N4 of the third pixel PX3, the first data voltage VDAT1 applied to the second data line DL2 may be transmitted to the fourth node N4 of the second pixel PX2, and the third data voltage VDAT3 applied to the fourth data line DL4 may be transmitted to the fourth node N4 of the fourth pixel PX4.

Referring to FIGS. 24 and 26, in the second period P2, the second data voltage VDAT2 output from the first output line OL1 is applied to the second data line DL2, and the fourth data voltage VDAT4 output from the second output line OL2 is applied to the fourth data line DL4. The first selection transistor TS1 and the second selection transistor TS2 are turned off in response to the selection signal SEL having the turn-off voltage level in the second period P2. The first data line DL1 and the third data line DL3 may be floated, the first data line DL1 may be charged with the first data voltage VDAT1, and the third data line DL3 may be charged with the third data voltage VDAT3. For example, the first data line DL1 and the third data line DL3 may be left in a floating state when the first selection transistor TS1 and the second selection transistor TS2 are turned off. In response to the write gate signal GW having the turn-on voltage level in the second period P2, the first data voltage VDAT1 charged in the first data line DL1 may be transmitted to the fourth node N4 of the first pixel PX1, the third data voltage VDAT3 charged in the third data line DL3 may be transmitted to the fourth node N4 of the third pixel PX3, the second data voltage VDAT2 applied to the second data line DL2 may be transmitted to the fourth node N4 of the second pixel PX2, and the fourth data voltage VDAT4 applied to the fourth data line DL4 may be transmitted to the fourth node N4 of the fourth pixel PX4.

In the embodiment described with reference to FIGS. 23 to 26, the number of selection transistors included in the demultiplexer 150 may decrease, so that a dead space of the display panel 112 may decrease. Further, the number of selection signals SEL for driving the selection transistors may decrease, so that power consumption of the demultiplexer 150 may decrease. For example, the embodiment of the demultiplexer 150 described with reference to FIGS. 23 to 26 may include less selection transistors than the embodiments of the of the demultiplexer 150 described with reference to FIGS. 15 to 22.

Figure 27:
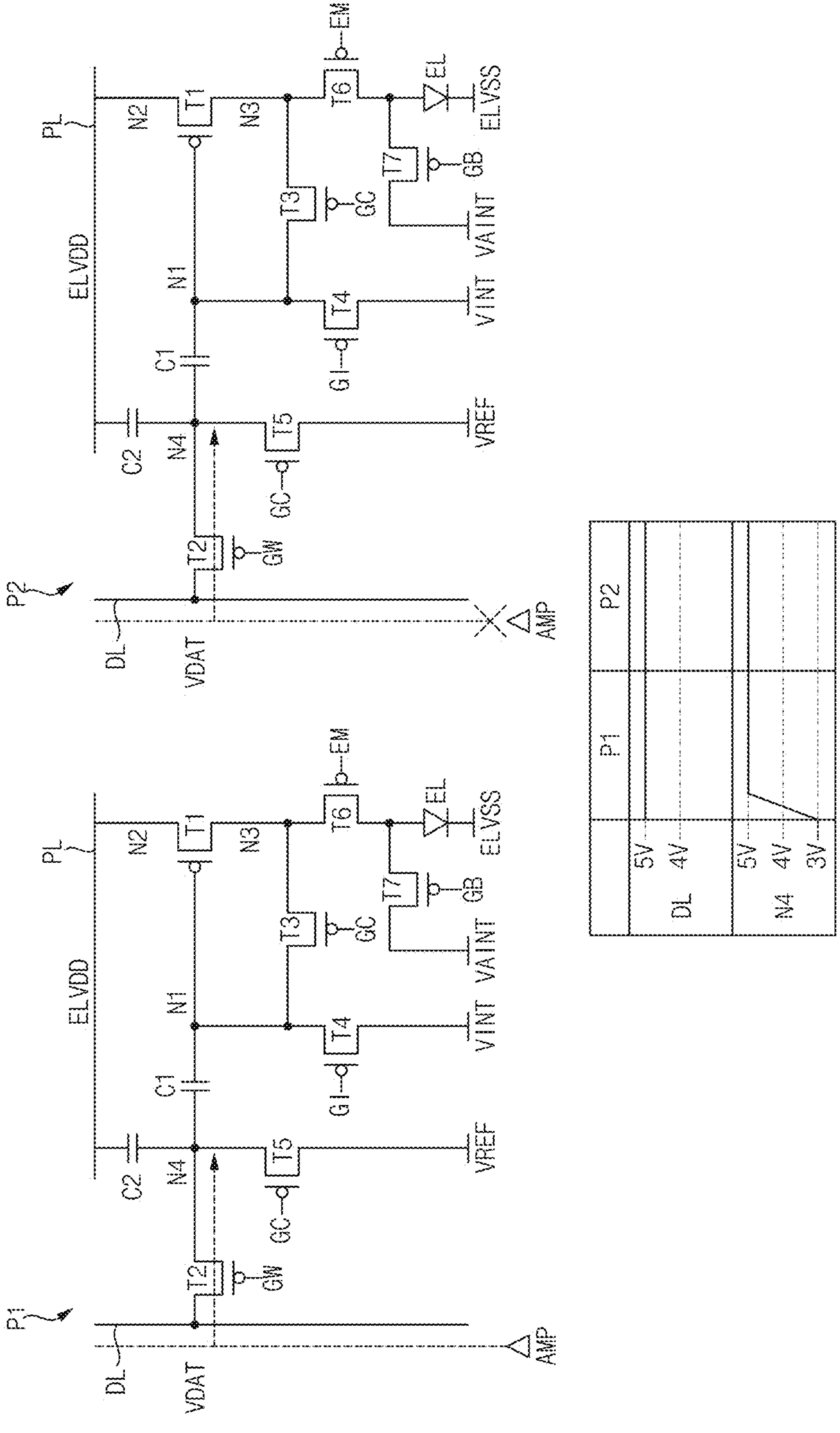
FIG. 27 is a view for describing an operation of a pixel according to an embodiment.

FIG. 27 is a view for describing an operation of a pixel according to an embodiment. FIG. 27 show the operation of the first pixel PX1 or the third pixel PX3 described with reference to FIG. 16 to 18 or 24 to 26.

Referring to FIG. 27, the data line DL is connected to an amplifier AMP of a data driver (e.g., 140) in the first period P1, so that the data voltage VDAT may be applied to the data line DL. For example, the data voltage VDAT may be 5 V, and the reference voltage REF may be 3 V. In the first period P1, the data line DL may be connected to the fourth node N4 by the turned-on second transistor T2, and a voltage (5 V) of the data line DL and a voltage (5 V) of the fourth node N4 may be equal to the data voltage VDAT.

The data line DL may be floated in the second period P2, so that the voltage of the data line DL may be maintained at the data voltage VDAT. For example, the second transistor T2 may be turned in the second period P2 to float the data line DL. Although the data line DL is floated, since the voltage (5 V) of the data line DL is equal to the voltage (5 V) of the fourth node N4 in the first period P1, the voltage of the data line DL may be maintained in the second period P2.

As described above, the pixel may emit light based on the $n^{th}$ data voltage VDAT[n] regardless of the $n-1^{th}$ data voltage VDAT[n−1]. Since the data voltage VDAT transmitted to the data line DL in the first period P1 is maintained at the voltage of the data line DL in the second period P2, and the same voltage (5 V) as the data voltage VDAT is transmitted to the fourth node N4 in the second period P2, the pixel may emit light based on the data voltage VDAT applied to the data line DL in the first period P1.

Figure 28:
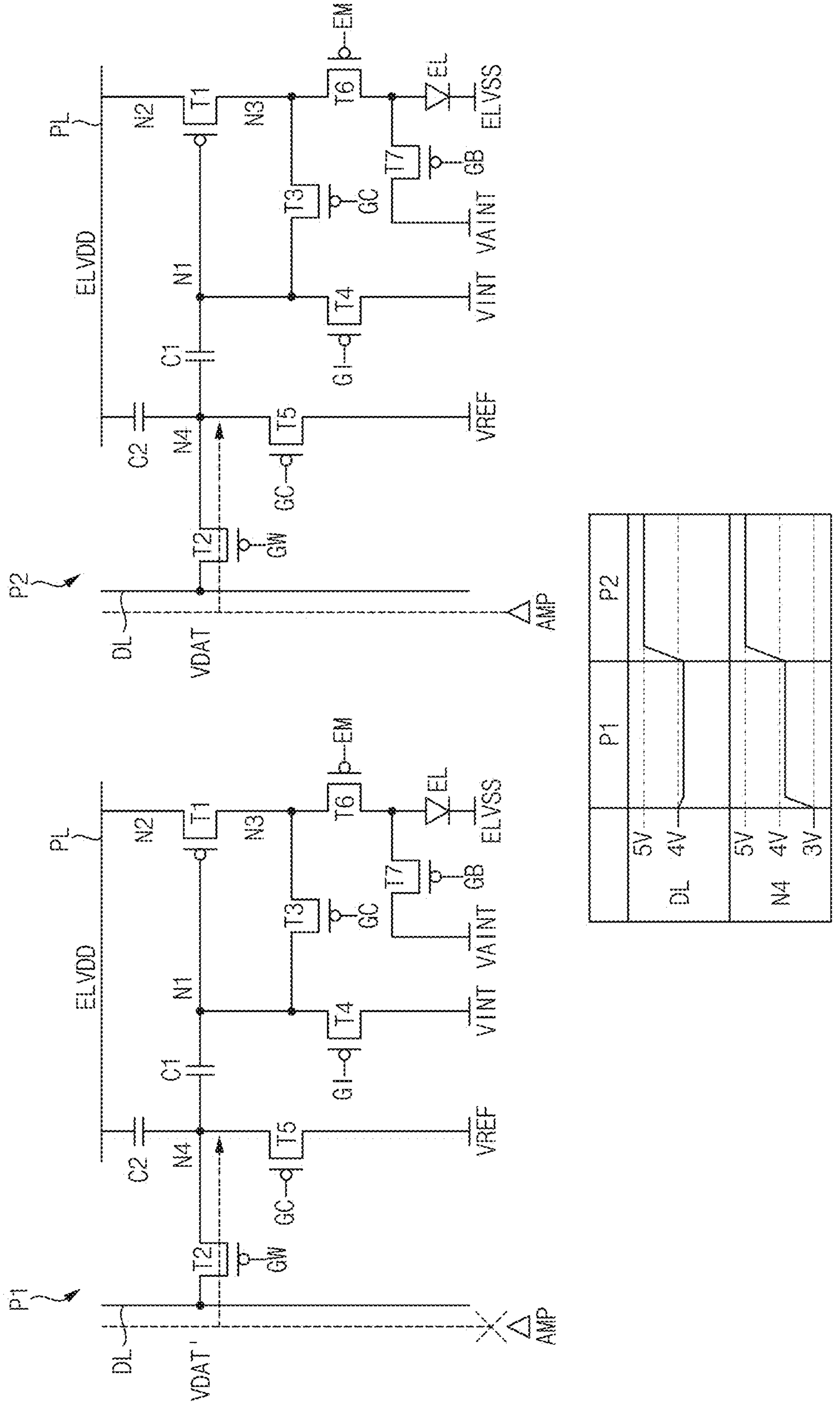
FIG. 28 is a view for describing an operation of a pixel according to an embodiment.

FIG. 28 is a view for describing an operation of a pixel according to an embodiment. FIG. 28 shows the operation of the second pixel PX2 or the fourth pixel PX4 described with reference to FIGS. 16 to 18.

Referring to FIG. 28, the data line DL is floated in the first period P1, so that the voltage of the data line DL is maintained at a previous data voltage VDAT'. For example, the previous data voltage VDAT' may be a data voltage for another pixel connected to the data line DL and located in the previous pixel row, and may be a voltage applied to the data line DL before the first period P1. For example, the previous data voltage VDAT' may be 4 V, and the reference voltage REF may be 3 V. Since the data line DL is connected to the fourth node N4 by the turned-on second transistor T2 in the first period P1 and then the data line DL is floated, the voltage of the data line DL and the voltage of the fourth node N4 may become less than the previous data voltage VDAT', and may become greater than the voltage (3 V) of the fourth node N4 before the first period P1.

The data line DL is then connected to the amplifier AMP of the data driver in the second period P2, so that the data voltage VDAT may be applied to the data line DL. Accordingly, the data voltage VDAT charged in the data line DL in the second period P2 may be different from the previous data voltage VDAT' charged in the data line DL in the first period P1. For example, the data voltage VDAT may be 5 V. In the second period P2, the data line DL may be connected to the fourth node N4 by the turned-on second transistor T2, and the voltage (5 V) of the data line DL and the voltage (5 V) of the fourth node N4 may become equal to the data voltage VDAT.

As described above, the pixel may emit light based on the $n^{th}$ data voltage VDAT[n] regardless of the $n-1^{th}$ data voltage VDAT[n−1]. Since the same voltage (5 V) as the data voltage VDAT is transmitted to the fourth node N4 in the second period P2, the pixel may emit light based on the data voltage VDAT applied to the data line DL in the second period P2.

Figure 29:
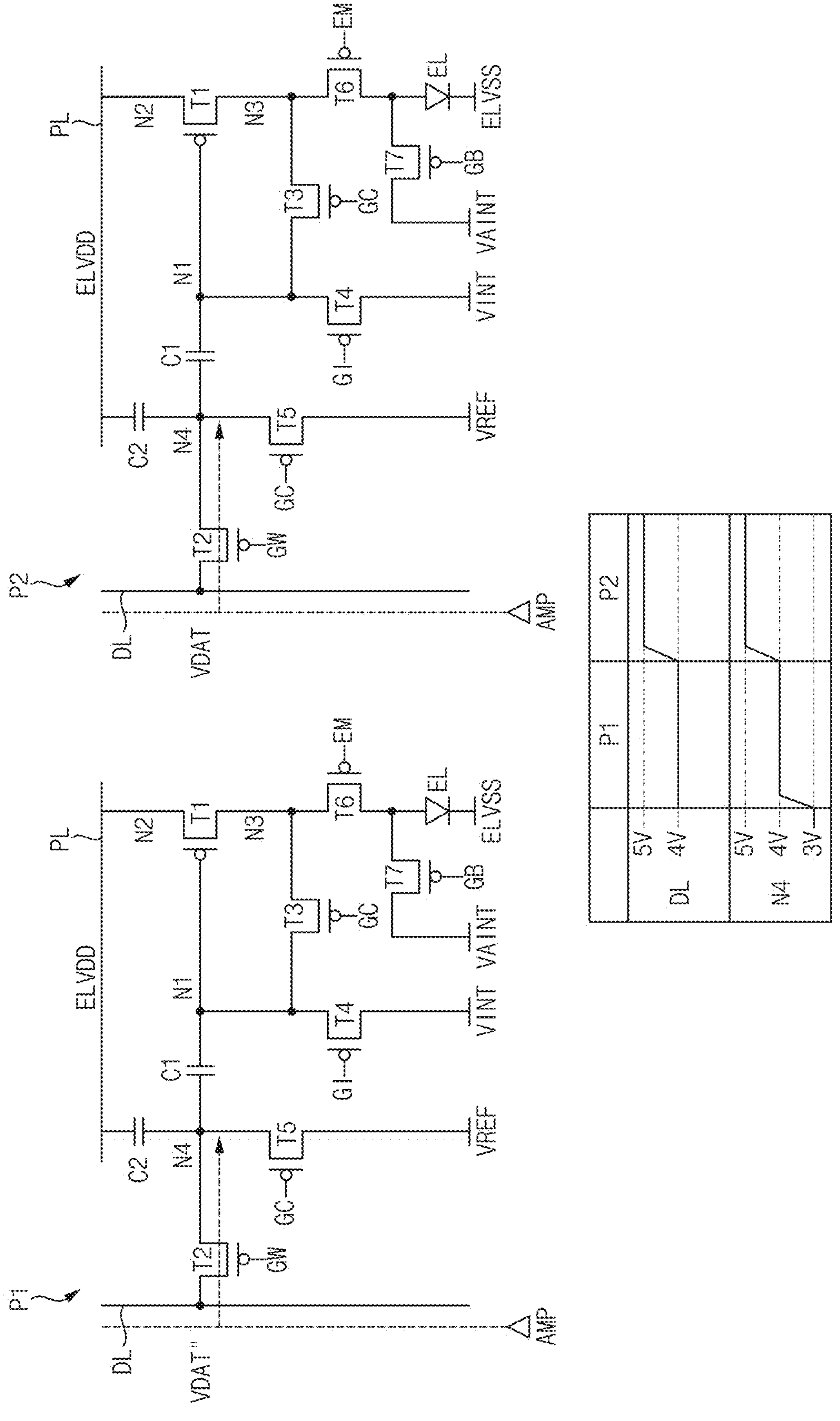
FIG. 29 is a view for describing an operation of a pixel according to an embodiment.

FIG. 29 is a view for describing an operation of a pixel according to an embodiment. FIG. 29 shows the operation of the second pixel PX2 or the fourth pixel PX4 described with reference to FIGS. 24 to 26.

Referring to FIG. 29, the data line DL is connected to the amplifier AMP of the data driver (e.g., 140) in the first period P1, so that a previous data voltage VDAT" may be applied to the data line DL. For example, the previous data voltage VDAT" may be a data voltage for another pixel connected to the amplifier AMP and located in the current pixel row. For example, the previous data voltage VDAT" may be 4 V, and the reference voltage REF may be 3 V. In the first period P1, the data line DL is connected to the fourth node N4 by the turned-on second transistor T2, and the voltage (4 V) of the data line DL and the voltage (4 V) of the fourth node N4 may become equal to the previous data voltage VDAT".

The data line DL is connected to the amplifier AMP of the data driver in the second period P2, so that the data voltage VDAT may be applied to the data line DL. Accordingly, the data voltage VDAT charged in the data line DL in the second period P2 may become different from the previous data voltage VDAT" charged in the data line DL in the first period P1. For example, the data voltage VDAT may be 5 V. In the second period P2, the data line DL may be connected to the fourth node N4 by the turned-on second transistor T2, and the voltage (5 V) of the data line DL and the voltage (5 V) of the fourth node N4 may become equal to the data voltage VDAT.

As described above, the pixel may emit light based on the $n^{th}$ data voltage VDAT[n] regardless of the $n-1^{th}$ data voltage VDAT[n−1]. Since the same voltage (5 V) as the data voltage VDAT is transmitted to the fourth node N4 in the second period P2, the pixel may emit light based on the data voltage VDAT applied to the data line DL in the second period P2.

Figure 30:
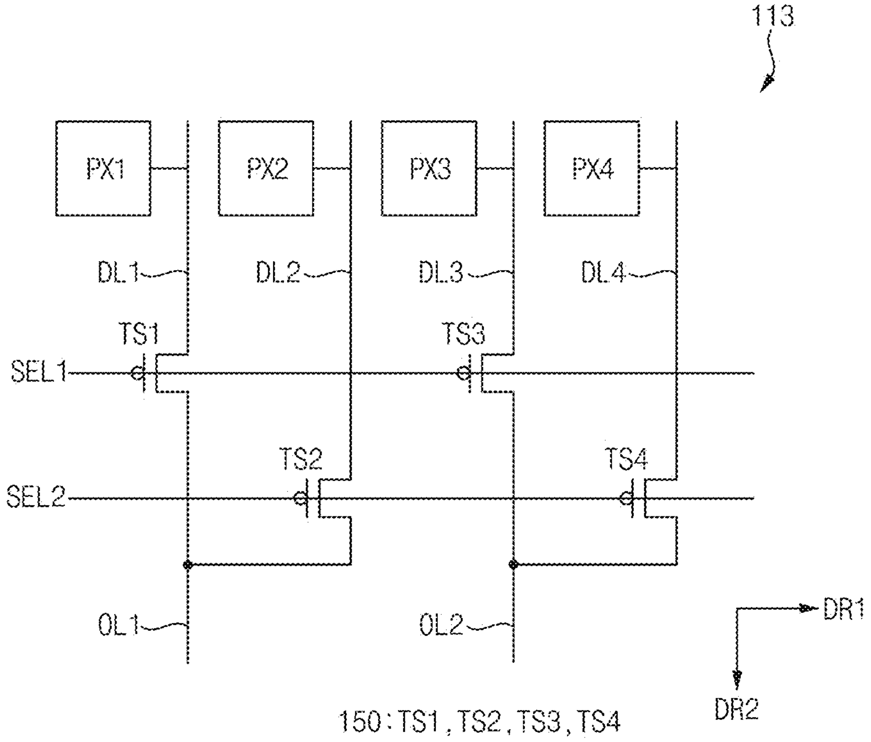
FIG. 30 is a view showing an example of a display panel included in the display device of FIG. 1.

FIG. 30 is a view showing an example of a display panel 113 included in the display device 100 of FIG. 1. Descriptions of components of the display panel 113 described with reference to FIG. 30, which are substantially the same as or similar to those of the display panel 111 described with reference to FIG. 15, will be omitted.

Referring to FIG. 30, a first pixel PX1, a second pixel PX2, a third pixel PX3, and a fourth pixel PX4 may be arranged along the first direction DR1 in one pixel row. In an embodiment, the first pixel PX1 is one of a red pixel and a blue pixel, the second pixel PX2 is a green pixel, the third pixel PX3 is another one of the red pixel and the blue pixel different from the first pixel PX1, and the fourth pixel PX4 is the green pixel. For example, when the first pixel PX1 is the red pixel, the third pixel PX3 may be the blue pixel.

A first data line DL1, a second data line DL2, a third data line DL3, and a fourth data line DL4 may be arranged along the first direction DR1. The first data line DL1, the second data line DL2, the third data line DL3, and the fourth data line DL4 are connected to the first pixel PX1, the second pixel PX2, the third pixel PX3, and the fourth pixel PX4, respectively.

In an embodiment, the first data line DL1, the second data line DL2, the third data line DL3, and the fourth data line DL4 may be disposed in one direction (e.g., the first direction DR1) from the first pixel PX1, the second pixel PX2, the third pixel PX3, and the fourth pixel PX4, respectively. A gap between the first data line DL1 and the second data line DL2, a gap between the second data line DL2 and the third data line DL3, and a gap between the third data line DL3 and the fourth data line DL4 may be equal or substantially equal. In an embodiment, the distance between the first data line DL1 and the second data line DL2, the distance between the second data line DL2 and the third data line DL3, and the distance between the third data line DL3 and the fourth data line DL4 are equal or substantially equal.

The demultiplexer 150 may selectively connect the first data line DL1 and the second data line DL2 to the first output line OL1, and may selectively connect the third data line DL3 and the fourth data line DL4 to the second output line OL2. In an embodiment, the demultiplexer 150 includes a first selection transistor TS1, a second selection transistor TS2, a third selection transistor TS3, and a fourth selection transistor TS4.

The first selection transistor TS1 may connect the first data line DL1 to the first output line OL1 in response to a first selection signal SEL1. The second selection transistor TS2 may connect the second data line DL2 to the first output line OL1 in response to a second selection signal SEL2. The third selection transistor TS3 may connect the third data line DL3 to the second output line OL2 in response to the first selection signal SEL1. The fourth selection transistor TS4 may connect the fourth data line DL4 to the second output line OL2 in response to the second selection signal SEL2. The first selection signal SEL1 and the second selection signal SEL2 may be provided by the controller 160.

Figure 31:
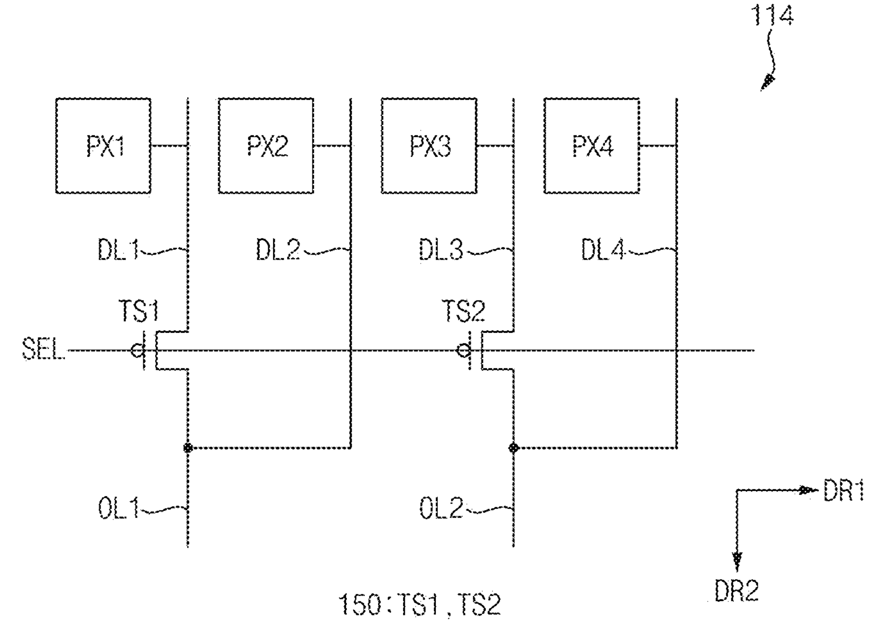
FIG. 31 is a view showing an example of a display panel included in the display device of FIG. 1.

FIG. 31 is a view showing an example of part of a display panel 114 included in the display device 100 of FIG. 1. Descriptions of components of the display panel 114 described with reference to FIG. 30, which are substantially the same as or similar to those of the display panel 113 described with reference to FIG. 30, will be omitted. The part of the display panel 114 may be used to implement part of the display panel 110.

Referring to FIG. 31, the demultiplexer 150 may selectively connect the first data line DL1 to the first output line OL1, and may selectively connect the third data line DL3 to the second output line OL2. In an embodiment, a part of the second data line DL2 is directly connected to the first output line OL1, and a part of the fourth data line DL4 is directly connected to the second output line OL2. In an embodiment, the demultiplexer 150 includes a first selection transistor TS1 and a second selection transistor TS2.

The first selection transistor TS1 may connect the first data line DL1 to the first output line OL1 in response to a selection signal SEL. The second selection transistor TS2 may connect the third data line DL3 to the second output line OL2 in response to the selection signal SEL. For example, the controller 160 may applied the selection signal SEL.

Figure 32:
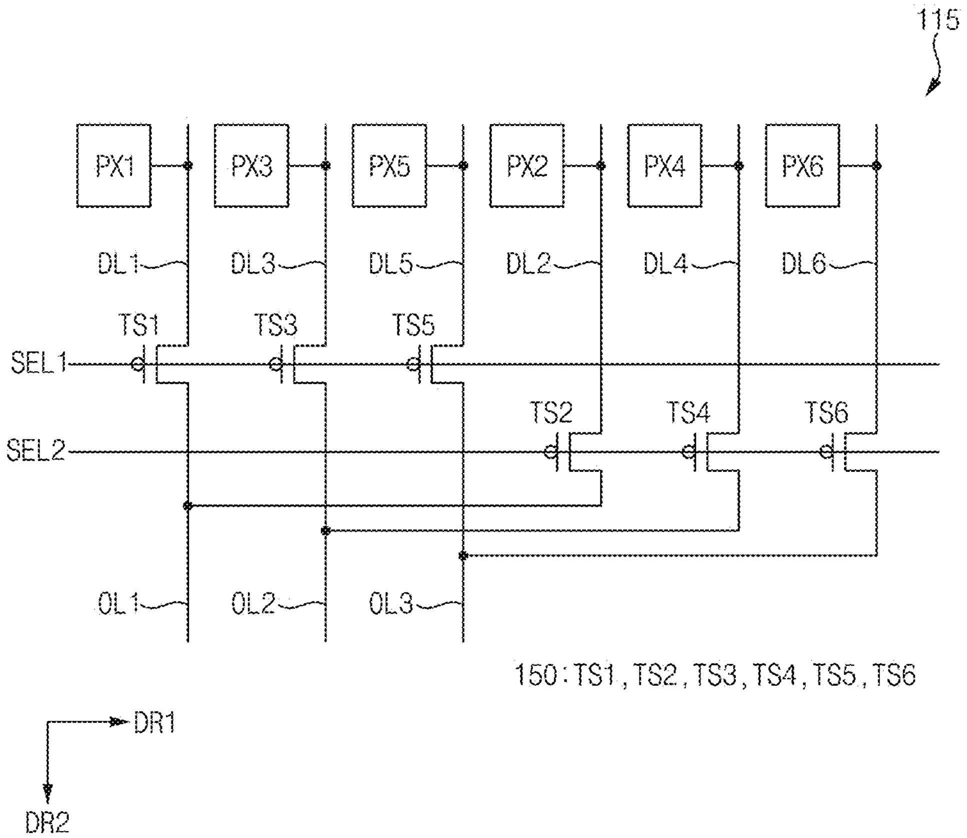
FIG. 32 is a view showing an example of a display panel included in the display device of FIG. 1.

FIG. 32 is a view showing an example of part of a display panel 115 included in the display device 100 of FIG. 1. The part of the display panel 115 may be used to implement part of the display panel 110.

Referring to FIG. 32, a first pixel PX1, a third pixel PX3, a fifth pixel PX5, a second pixel PX2, a fourth pixel PX4, and a sixth pixel PX6 may be arranged along the first direction DR1 in one pixel row. In an embodiment, each of the first pixel PX1 and the second pixel PX2 is a red pixel, each of the third pixel PX3 and the fourth pixel PX4 is a green pixel, and each of the fifth pixel PX5 and the sixth pixel PX6 is a blue pixel. In an alternative embodiment, each of the first pixel PX1 and the second pixel PX2 is a blue pixel and each of the fifth pixel PX5 and the sixth pixel PX6 is a red pixel.

A first data line DL1, a third data line DL3, a fifth data line DL5, a second data line DL2, a fourth data line DL4, and a sixth data line DL6 may be arranged along the first direction DR1. The first data line DL1, the second data line DL2, the third data line DL3, the fourth data line DL4, the fifth data line DL5, and the sixth data line DL6 may be connected to the first pixel PX1, the second pixel PX2, the third pixel PX3, the fourth pixel PX4, the fifth pixel PX5, and the sixth pixel PX6, respectively.

A first output line OL1, a second output line OL2, and a third output line OL3 may be arranged along the first direction DR1.

The demultiplexer 150 may selectively connect the first data line DL1 and the second data line DL2 to the first output line OL1, may selectively connect the third data line DL3 and the fourth data line DL4 to the second output line OL2, and may selectively connect the fifth data line DL5 and the sixth data line DL6 to the third output line OL3. In an embodiment, the demultiplexer 150 includes a first selection transistor TS1, a second selection transistor TS2, a third selection transistor TS3, a fourth selection transistor TS4, a fifth selection transistor TS5, and a sixth selection transistor TS6.

The first selection transistor TS1 may connect the first data line DL1 to the first output line OL1 in response to a first selection signal SEL1. The second selection transistor TS2 may connect the second data line DL2 to the first output line OL1 in response to a second selection signal SEL2. The third selection transistor TS3 may connect the third data line DL3 to the second output line OL2 in response to the first selection signal SEL1. The fourth selection transistor TS4 may connect the fourth data line DL4 to the second output line OL2 in response to the second selection signal SEL2. The fifth selection transistor TS5 may connect the fifth data line DL5 to the third output line OL3 in response to the first selection signal SEL1. The sixth selection transistor TS6 may connect the sixth data line DL6 to the third output line OL3 in response to the second selection signal SEL2.

Figure 33:
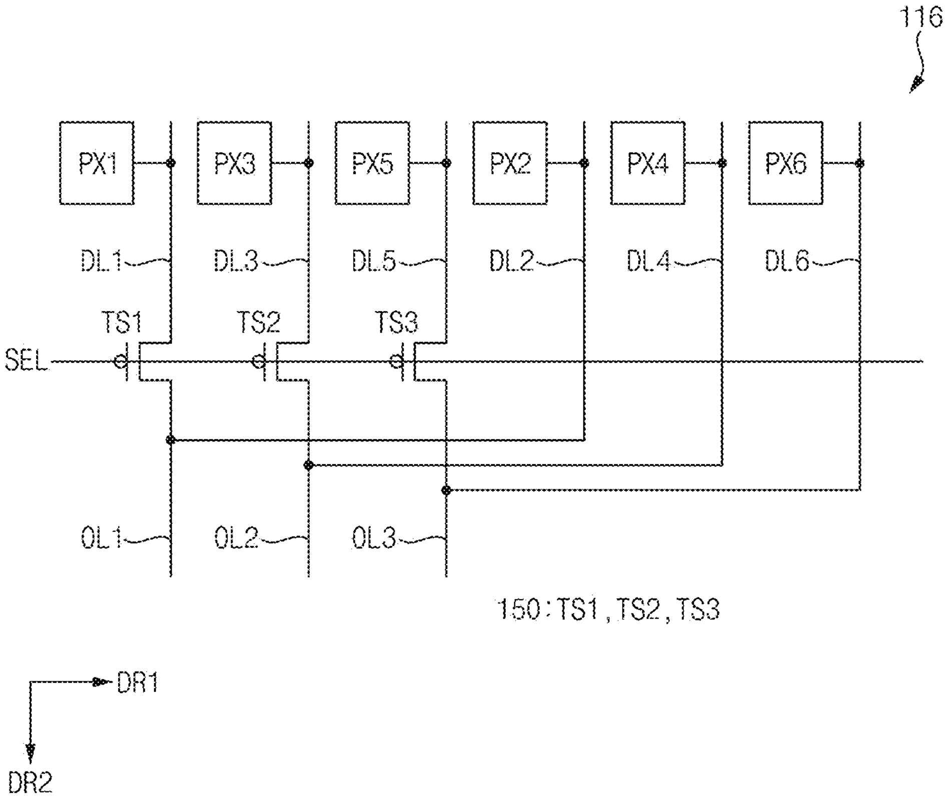
FIG. 33 is a view showing an example of a display panel included in the display device of FIG. 1.

FIG. 33 is a view showing an example of part of a display panel 116 included in the display device of FIG. 1. Descriptions of components of the display panel 116 described with reference to FIG. 33, which are substantially the same as or similar to those of the display panel 115 described with reference to FIG. 32, will be omitted. The part of the display panel 116 may be used to implement part of the display panel 110.

Referring to FIG. 33, the demultiplexer 150 may selectively connect the first data line DL1 to the first output line OL1, may selectively connect the third data line DL3 to the second output line OL2, and may selectively connect the fifth data line DL5 to the third output line OL3. The second data line DL2 may be directly connected to the first output line OL1, the fourth data line DL4 may be directly connected to the second output line OL2, and the sixth data line DL6 may be directly connected to the third output line OL3. In an embodiment, the demultiplexer 150 may include a first selection transistor TS1, a second selection transistor TS2, and a third selection transistor TS3.

The first selection transistor TS1 may connect the first data line DL1 to the first output line OL1 in response to a selection signal SEL. The second selection transistor TS2 may connect the third data line DL3 to the second output line OL2 in response to the selection signal SEL. The third selection transistor TS3 may connect the fifth data line DL5 to the third output line OL3 in response to the selection signal SEL.

Figure 34:
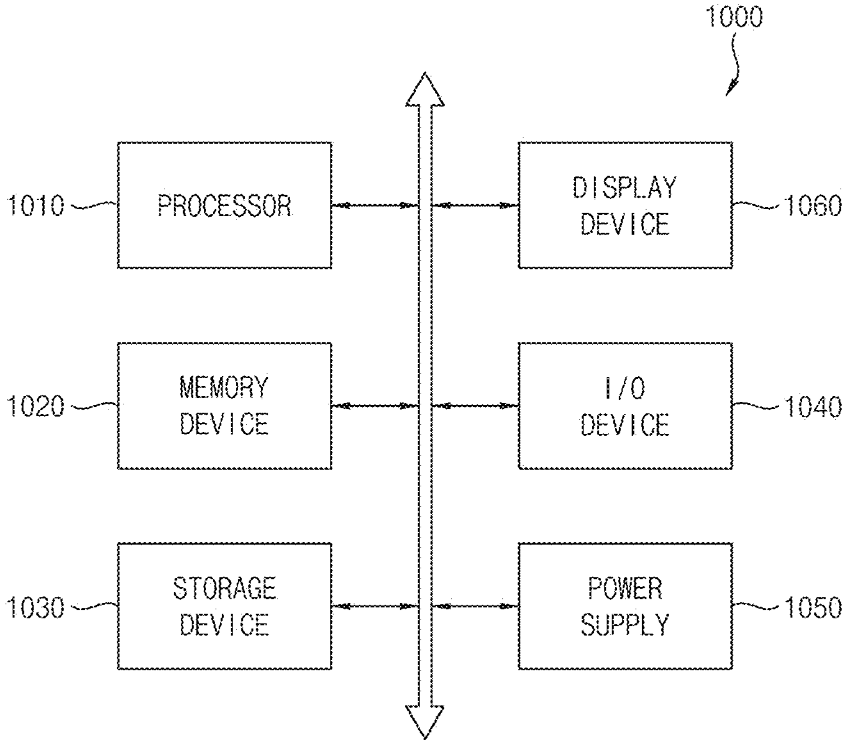
FIG. 34 is a block diagram showing an electronic apparatus according to an embodiment.

FIG. 34 is a block diagram showing an electronic apparatus 1000 according to an embodiment.

Referring to FIG. 34, the electronic apparatus 1000 may include a processor 1010, a memory device 1020, a storage device 1030, an input/output ("I/O") device 1040, a power supply 1050, and a display device 1060. The electronic apparatus 1000 may further include a plurality of ports capable of communicating with a video card, a sound card, a memory card, a USB device, and the like, or communicating with other systems.

The processor 1010 may perform specific calculations or tasks. According to an embodiment, the processor 1010 may be a microprocessor, a central processing unit ("CPU"), or the like. The processor 1010 may be connected to other components through an address bus, a control bus, a data bus, and the like. According to an embodiment, the processor 1010 may also be connected to an expansion bus such as a peripheral component interconnect ("PCI") bus.

The processor 1010 may control the display device 1060. In an embodiment, the processor 1010 may provide the first image data IMD1 of FIG. 1 and the control signal CNT of FIG. 1 to the display device 1060.

The memory device 1020 may store data required for an operation of the electronic apparatus 1000. For example, the memory device 1020 may include: a nonvolatile memory device such as an erasable programmable read-only memory ("EPROM"), an electrically erasable programmable read-only memory ("EEPROM"), a flash memory, a phase change random access memory ("PRAM"), a resistance random access memory ("RRAM"), a nano floating gate memory ("NFGM"), a polymer random access memory ("PoRAM"), a magnetic random access memory ("MRAM"), or a ferroelectric random access memory ("FRAM"); and/or a volatile memory device such as a dynamic random access memory ("DRAM"), a static random access memory ("SRAM"), or a mobile DRAM.

The storage device 1030 may include a solid state drive ("SSD"), a hard disk drive ("HDD"), a CD-ROM, and the like. The I/O device 1040 may include: an input device such as a keyboard, a keypad, a touch pad, a touch screen, or a mouse; and an output device such as a speaker or a printer. The power supply 1050 may supply a power required for the operation of the electronic apparatus 1000. The display device 1060 may be connected to other components through the buses or other communication links. The display device 1060 may correspond to the display device 100 of FIG. 1.

The display device according to the embodiments may be applied to a display device included in a computer, a notebook, a mobile phone, a smart phone, a smart pad, a smart watch, a portable media player (PMP), a personal digital assistant (PDA), an MP3 player, or the like.

Although display devices and electronic apparatuses according to various embodiments have been described with reference to the drawings, the illustrated embodiments may be variously modified and changed without departing from the technical spirit described in the following claims.

What is claimed is:

1. A display device, comprising:

a first pixel and a second pixel disposed in a pixel row;

a first data line and a second data line connected to the first pixel and the second pixel, respectively;

a data driver which provides a first data voltage and a second data voltage to a first output line; and a demultiplexer which selectively connects the first data line and the second data line to the first output line, wherein each of the first pixel and the second pixel comprises:

a first transistor including a gate electrode connected to a first node, a first electrode connected to a second node, and a second electrode connected to a third node;

a second transistor including a gate electrode which receives a write gate signal, a first electrode connected to a corresponding data line among the first data line and the second data line, and a second electrode;

a third transistor including a gate electrode which receives a compensation gate signal, a first electrode connected to the third node, and a second electrode connected to the first node;

a first capacitor connected between the first node and the second electrode of the second transistor; and a light emitting element which emits light corresponding to a driving current generated by the first transistor, wherein the first data voltage is written to the first pixel through the first data line in a first period of a writing period included in a frame period in which the write gate signal has a turn-on voltage level, wherein the second data voltage is written to the same first pixel through the first data line in a second period of the writing period that is after the first period, and wherein the second pixel is configured to receive a data voltage through the second data line during a writing period included in the frame period.

2. The display device of claim 1, further comprising:

a third pixel and a fourth pixel disposed in the pixel row; and a third data line and a fourth data line connected to the third pixel and the fourth pixel, respectively, wherein the data driver provides a third data voltage and a fourth data voltage to a second output line, wherein the demultiplexer selectively connects the third data line and the fourth data line to the second output line, wherein the third data voltage is written to the third pixel through the third data line in the first period, and wherein the fourth data voltage is written to the fourth pixel through the fourth data line in the second period.

3. The display device of claim 2, wherein the first pixel is one of a red pixel and a blue pixel, wherein the second pixel is another one of the red pixel and the blue pixel different from the first pixel, and wherein each of the third and fourth pixels is a green pixel.

4. The display device of claim 3, wherein the first data line and the third data line are disposed between the first pixel and the third pixel, and wherein the second data line and the fourth data line are disposed between the second pixel and the fourth pixel.

5. The display device of claim 3, wherein the demultiplexer comprises:

a first selection transistor which connects the first data line to the first output line in response to a first selection signal;

a second selection transistor which connects the second data line to the first output line in response to a second selection signal;

a third selection transistor which connects the third data line to the second output line in response to the first selection signal; and a fourth selection transistor which connects the fourth data line to the second output line in response to the second selection signal.

6. The display device of claim 3, wherein the demultiplexer comprises:

a first selection transistor which connects the first data line to the first output line in response to a selection signal; and a second selection transistor which connects the third data line to the second output line in response to the selection signal, and wherein the second and fourth data lines are directly connected the first and second output lines, respectively.

7. The display device of claim 2, wherein the first pixel is one of a red pixel and a blue pixel, wherein each of the second and fourth pixels is a green pixel, and wherein the third pixel is another one of the red pixel and the blue pixel different from the first pixel.

8. The display device of claim 7, wherein the demultiplexer comprises:

a first selection transistor which connects the first data line to the first output line in response to a first selection signal;

a second selection transistor which connects the second data line to the first output line in response to a second selection signal;

a third selection transistor which connects the third data line to the second output line in response to the first selection signal; and a fourth selection transistor which connects the fourth data line to the second output line in response to the second selection signal.

9. The display device of claim 7, wherein the demultiplexer comprises:

a first selection transistor which connects the first data line to the first output line in response to a selection signal; and a second selection transistor which connects the third data line to the second output line in response to the selection signal, and wherein the second and fourth data lines are directly connected the first and second output lines, respectively.

10. The display device of claim 2, further comprising:

a fifth pixel and a sixth pixel disposed in the pixel row; and a fifth data line and a sixth data line connected to the fifth pixel and the sixth pixel, respectively, wherein the data driver provides a fifth data voltage and a sixth data voltage to a third output line, wherein the demultiplexer selectively connects the fifth data line and the sixth data line to the third output line, wherein the fifth data voltage is written to the fifth pixel through the fifth data line in the first period, and wherein the sixth data voltage is written to the sixth pixel through the sixth data line in the second period.

11. The display device of claim 10, wherein each of the first and second pixels is a red pixel, wherein each of the third and fourth pixels is a green pixel, and wherein each of the fifth and sixth pixels is a blue pixel.

12. The display device of claim 11, wherein the demultiplexer comprises:

a first selection transistor which connects the first data line to the first output line in response to a first selection signal;

a second selection transistor which connects the second data line to the first output line in response to a second selection signal;

a third selection transistor which connects the third data line to the second output line in response to the first selection signal;

a fourth selection transistor which connects the fourth data line to the second output line in response to the second selection signal;

a fifth selection transistor which connects the fifth data line to the third output line in response to the first selection signal; and a sixth selection transistor which connects the sixth data line to the third output line in response to the second selection signal.

13. The display device of claim 11, wherein the demultiplexer comprises:

a first selection transistor which connects the first data line to the first output line in response to a selection signal;

a second selection transistor which connects the third data line to the second output line in response to the selection signal; and a third selection transistor which connects the fifth data line to the third output line in response to the selection signal, and wherein the second, fourth, and sixth data lines are directly connected the first, second, and third output lines, respectively.

14. The display device of claim 1, wherein each of the first pixel and the second pixel further comprise:

a fourth transistor including a gate electrode which receives an initialization gate signal, a first electrode which receives a first initialization voltage, and a second electrode connected to the first node;

a fifth transistor including a gate electrode which receives the compensation gate signal, a first electrode which receives a reference voltage, and a second electrode connected to a fourth node to which the second electrode of the second transistor and the first capacitor are connected;

a sixth transistor including a gate electrode, a first electrode connected to the third node, and a second electrode connected to the light emitting element;

a seventh transistor including a gate electrode which receives a bypass gate signal, a first electrode which receives a second initialization voltage, and a second electrode connected to the light emitting element; and a second capacitor connected between a power line which transmits a driving voltage and the fourth node.

15. The display device of claim 14, wherein the power line is connected to the second node, and wherein the gate electrode of the sixth transistor receives an emission control signal.

16. The display device of claim 14, wherein each of the first pixel and the second pixel further comprises:

an eighth transistor including a gate electrode which receives a first emission control signal, a first electrode connected to the power line, and a second electrode connected to the second node; and a ninth transistor including a gate electrode which receives the bypass gate signal, a first electrode which receives a bias voltage, and a second electrode connected to the second node;

wherein the gate electrode of the sixth transistor receives a second emission control signal.

17. The display device of claim 14, wherein each of the first pixel and the second pixel further comprises:

an eighth transistor including a gate electrode which receives an emission control signal, a first electrode connected to the power line, and a second electrode connected to the second node;

a ninth transistor including a gate electrode which receives the bypass gate signal, a first electrode which receives a bias voltage, and a second electrode connected to the second node; and a tenth transistor including a gate electrode which receives the compensation gate signal, a first electrode connected to the power line, and a second electrode connected to the second node, and wherein the gate electrode of the sixth transistor receives the emission control signal.

18. The display device of claim 14, wherein each of the first transistor, the second transistor, the third transistor, the fourth transistor, the fifth transistor, the sixth transistor, and the seventh transistor is a P-type transistor.

19. The display device of claim 1, wherein each of the first pixel and the second pixel further comprises:

a fourth transistor including a gate electrode which receives the compensation gate signal, a first electrode which receives a reference voltage, and a second electrode connected to a fourth node to which the first capacitor is connected;

a fifth transistor including a gate electrode which receives a subsequent compensation gate signal, a first electrode connected to the second node, and a second electrode connected to the fourth node;

a sixth transistor including a gate electrode which receives an emission control signal, a first electrode connected to the third node, and a second electrode connected to the light emitting element;

a seventh transistor including a gate electrode which receives a bypass gate signal, a first electrode which receives an initialization voltage, and a second electrode connected to the light emitting element;

an eighth transistor including a gate electrode which receives the bypass gate signal, a first electrode connected to a power line which transmits a driving voltage, and a second electrode connected to the second node; and a second capacitor connected between the power line and the fourth node.

20. The display device of claim 19, wherein each of the first transistor, the second transistor, the sixth transistor, and the eighth transistor is a P-type transistor, and wherein each of the third transistor, the fourth transistor, the fifth transistor, and the seventh transistor is a N-type transistor.

21. A display device, comprising:

a pixel which emits light based on a data voltage;

a data line connected to the pixel; and a data driver which provides the data voltage to the data line, wherein the pixel comprises:

a first transistor including a gate electrode connected to a first node, a first electrode connected to a second node, and a second electrode connected to a third node;

a second transistor including a gate electrode which receives a write gate signal, a first electrode connected to the data line, and a second electrode;

a third transistor including a gate electrode which receives a compensation gate signal, a first electrode connected to the third node, and a second electrode connected to the first node;

a first capacitor connected between the first node and the second electrode of the second transistor; and a light emitting element which emits light corresponding to a driving current generated by the first transistor, wherein the data line is connected to the data driver so that the data voltage is applied to the data line in a first period of a writing period included in a frame period in which the write gate signal has a turn-on voltage level, and wherein the data line is floated in a second period of the writing period that is after the first period while the write gate signal continues to have the turn-on voltage level so that a voltage of the data line is maintained at the data voltage.

22. A display device, comprising:

a pixel which emits light based on a data voltage;

a data line connected to the pixel; and a data driver which provides the data voltage to the data line, wherein the pixel comprises:

a first transistor including a gate electrode connected to a first node, a first electrode connected to a second node, and a second electrode connected to a third node;

a second transistor including a gate electrode which receives a write gate signal, a first electrode connected to the data line, and a second electrode;

a third transistor including a gate electrode which receives a compensation gate signal, a first electrode connected to the third node, and a second electrode connected to the first node;

a first capacitor connected between the first node and the second electrode of the second transistor, and a light emitting element which emits light corresponding to a driving current generated by the first transistor, wherein the data line is charged with a previous data voltage different from the data voltage in a first period of a writing period included in a frame period in which the write gate signal has a turn-on voltage level, and wherein the data line is connected to the data driver so that the data voltage is applied to the data line in a second period of the writing period that is after the first period while the write gate signal continues to have the turn-on voltage level.

23. The display device of claim 22, wherein the data line is floated so that a voltage of the data line is maintained at the previous data voltage in the first period.

24. The display device of claim 22, wherein the data line is connected to the data driver so that the previous data voltage is applied to the data line in the first period.

25. An electronic apparatus comprising a display device which displays an image and a processor which controls the display device, the display device comprising:

a first pixel and a second pixel disposed in a pixel row;

a first data line and a second data line connected to the first pixel and the second pixel, respectively;

a data driver which provides a first data voltage and a second data voltage to a first output line; and a demultiplexer which selectively connects the first data line and the second data line to the first output line, wherein each of the first pixel and the second pixel comprises:

a first transistor including a gate electrode connected to a first node, a first electrode connected to a second node, and a second electrode connected to a third node;

a second transistor including a gate electrode which receives a write gate signal, a first electrode connected to a corresponding data line among the first data line and the second data line, and a second electrode;

a third transistor including a gate electrode which receives a compensation gate signal, a first electrode connected to the third node, and a second electrode connected to the first node;

a first capacitor connected between the first node and the second electrode of the second transistor; and a light emitting element which emits light corresponding to a driving current generated by the first transistor, wherein the first data voltage is written to the first pixel through the first data line in a first period of a writing period included in a frame period in which the write gate signal has a turn-on voltage level, wherein the second data voltage is written to the same first pixel through the first data line in a second period of the writing period that is after the first period, and wherein the second pixel is configured to receive a data voltage through the second data line during a writing period included in the frame period.

* * * * *